(12) United States Patent
Krishnamurthy et al.

(10) Patent No.: US 6,910,024 B2
(45) Date of Patent: Jun. 21, 2005

(54) SYSTEM FOR PRICING-BASED QUALITY OF SERVICE (PQOS) CONTROL IN NETWORKS

(75) Inventors: Srikanth Krishnamurthy, Riverside, CA (US); Dorgham Sisalem, Berlin (DE); Son Dao, Northridge, CA (US)

(73) Assignee: HRL Laboratories, LLC, Malibu, CA (US)

( * ) Notice: Subject to any disclaimer, the term of this patent is extended or adjusted under 35 U.S.C. 154(b) by 569 days.

(21) Appl. No.: 09/777,458

(22) Filed: Feb. 5, 2001

(65) Prior Publication Data

US 2001/0025310 A1 Sep. 27, 2001

Related U.S. Application Data

(60) Provisional application No. 60/180,450, filed on Feb. 4, 2000.

(51) Int. Cl.[7] .............................................. G06F 17/60
(52) U.S. Cl. ...................... 705/400; 700/108; 702/182; 705/11
(58) Field of Search ........................ 700/108; 702/182; 705/1, 7, 8, 11, 400, 418

(56) References Cited

U.S. PATENT DOCUMENTS

| | | | | |
|---|---|---|---|---|
| 5,633,861 | A | * 5/1997 | Hanson et al. | 370/232 |
| 6,363,319 | B1 | * 3/2002 | Hsu | 701/202 |
| 6,690,929 | B1 | * 2/2004 | Yeh | 455/406 |

FOREIGN PATENT DOCUMENTS

| | | |
|---|---|---|
| WO | WO 94/14256 A1 | * 6/1994 |
| WO | WO 97 3545 A | 9/1997 |
| WO | WO 02/085045 A1 | * 10/2002 |

OTHER PUBLICATIONS

Brown: Get smart about integration. (includes related articles on bandwidth on demand, network intelligence, and reliability) Networking Management, Jun. 1991, vol. 9, No. 7, p. 48.*

Sitmann R., "Tarifmodelle Gegen Status Auf Der Infobahn" Funkschau, Franzis–Verlag K.G. Munchen, DE, vol. 71, No. 8, Apr. 3, 1998, pp. 28–30, XP000779238.

Song J–Y et al., "Performance Analysis of Wireless Differentiated Internet Service in IMT–2000 System", 1999 IEEE 49th Vehicular Technology Conference, Houston, TX, May 16–20, 1999, New York, NY: IEEE, US, vol. 3 conf. 49, pp. 2080–2083, XP000936177.

S. Shenker, D. Clark, D. Estrin, S. Herzog, "Pricing in computer networks: Reshaping the research agenda" Telecommunications Policy, 'Online! vol. 20, No. 3, Jan. 11, 1996, XP002176484.

Blake, S., et al. "RFC 2475—An Architecture for differentiated services" Architecture for Differentiated Services, XX, XX, Dec. 1, 1998, XP002139608.

(Continued)

Primary Examiner—Edward R. Cosimano
(74) Attorney, Agent, or Firm—Tope-McKay & Associates

(57) ABSTRACT

A data flow system, where a source 100 transmits a reservation packet to an ingress element 102. The ingress element 102 polices incoming message traffic and collects data flow information. Quality of service differentiation is realized by marking data packets of different data flows. The ingress element 102 registers the reservation packet and forwards the request to a core router 106. The core router 106 evaluates the service level required, and available resources. Based on this evaluation the core router 106 will reject, accept, or modify the received message, indicate the price for the requested level of service, and forward the reservation packet. The process is repeated until the reservation packet reaches the destination 110, which sends a feedback message to the source 100 indicating the result of the reservation packet. After establishing a reservation, source 100 transmits periodic control messages and collects information regarding resource availability, and the flow path.

24 Claims, 9 Drawing Sheets

OTHER PUBLICATIONS

S. Herzog, S. Shenker, and D. Estrin. Sharing the cost of multicast trees: An axiomatic analysis. In SIGCOMM Symposium on Communications Architectures and Protocols. ACM, Aug. 1995.

C. A. Sunshine. Source routing in computer networks. ACM Computer Communication Review, 7(1):29–33, Jan. 1977.

B. Nandy, N. Seddigh, and P. Pieda. Diffserv's assured forwarding PHB: what assurance does the customer have? In Proc. International Workshop on Network and Operating System Support for Digital Audio and Video (NOSSDAV), Basking Ridge, New Jersey, Jun. 1999.

I. Stoica and H. Zhang. Providing guaranteed services without per flow management. In Special Interest Group on Data Communication (SIGCOMM'99), Cambridge, USA, Aug. 1999.

S. McCanne, M. Vetterli, and V. Jacobson, "Low–complexity video coding for receiver–driven layered multicast", IEEE Journal on Selected Areas in Communications, 16(6), Aug. 1997.

M. Karsten, J. Schmitt, L. Wolf, and R. Steinmetz, "Cost and Price Calculation for Internet Integrated Services", Fachtagung ITG/VDI Fachtgung Kommunication in Verteilten Systemen (KiVS'99), Darmstadt, Germany, 1999.

P.P. Pan and H. Schulzrinne, "YESSIR: A Simple Reservation Mechanism for the Internet", In Proc. International Workshop on Network and Operating System Support for Digital Audio and Video (NOSSDAV), Cambridge, England, Jul. 1998, also IBM Research Technical Report TC20967.

J. Nonnenmacher and E.W. Biersack, "Optimal Multicast Feedback", In Proceedings of the Conference on Computer Communications (IEEE Infocom), San Francisco, USA, Mar. 1998.

D. Sisalem and F. Emanuel, "QoS Control Using Adaptive Layered Data Transmission", In IEEE Multimedia Systems Conference'98, Austin, TX, USA, Jun. 1998.

\* cited by examiner

SYSTEM FOR PRICING-BASED QUALITY OF SERVICE (PQOS) CONTROL IN NETWORKS

CLAIM OF PRIORITY

This application claims the benefit of provisional application No. 60/180,450, titled AN ARCHITECTURE FOR PRICING-BASED QUALITY OF SERVICE CONTROL (PQoS) IN THE INTERNET, filed Feb. 4, 2000 in the United States Patent and Trademark Office.

TECHNICAL FIELD

The present invention is related to network architecture, and more specifically to a system for pricing-based quality of service control in networks.

BACKGROUND

Existing work in the area of quality of service (QoS) assurance in network systems has resulted in essentially two major protocols. The integrated service (IntServ) model provides a flexible architecture in which each end system, or destination node, in a network can ask for a specific QoS and other specific parameters. The end system signals its requests using some signaling protocol. This results in the reservation of network resources. In order to guarantee the reserved resources for a flow, each traversed core router on the path connecting the source to the destination nodes needs to maintain per-flow state information about the flow and its requested resources. To avoid data flow state inconsistency, due to node failures for example, signaling protocols often use soft state information that needs to be refreshed periodically.

The need for maintaining per-flow states and periodically refreshing these data results in scaling problems for signaling protocols when handling a large number of flows. The differentiated service (DiffServ) model was designed to avoid this problem by using service level agreements (SLAs) between the network providers and the users. These SLAs describe the QoS level the aggregated traffic of a user can expect from the provider. Traffic sent in conformance with the established SLA is marked as belonging to a specific QoS level. At the core routers, data packets are serviced differently based on their marked QoS level. As all packets with the same marks are treated equally, the core routers need only maintain information describing the resources allocated for the supported QoS levels. As the SLAs are used for traffic aggregates, there is no need for per-flow states. Additionally, with the DiffServ model only the edge elements need to police incoming traffic and take admission control decisions. Core routers are expected to be dimensioned large enough to fulfill the SLAs made between the network provider and its users. While such an approach avoids the scalability problems of the integrated service model, it is, however, rather rigid. SLAs are mainly established in a static manner or are changed only infrequently, usually on the order of days or weeks. Hence, the DiffServ model does not allow the user to increase or decrease the amount of its reserved resources in accordance with its traffic requirements. In addition to the static nature of the SLAs, specifying a QoS level for an aggregate of flows can result in unfair distribution of resources among the flows belonging to the same aggregate due to the aggressiveness of some flows, difference in round trip delays and taken paths. To ensure a specific and stable QoS level, the network provider needs to dimension its network in a manner as to provide the user with the agreed upon QoS level on any path taken by the user at any time in accordance with the SLA. As the exact paths a user's traffic might take in the network are not known in advance, a major drawback is that the network needs to be highly over-provisioned to account for all possible cases. This is even more pronounced for the case of multicast as the user's traffic might take different paths in the provider's network, and hence enough resources must be available on all paths simultaneously.

Thus it is desirable to provide a system that combines the flexibility of the IntServ model and the simplicity of the DiffServ model. A system of this type would allow users to make per-flow reservations while simultaneously keeping the networks core routers relatively simple.

SUMMARY OF THE INVENTION

An method and apparatus for pricing-based quality of service delivery of data packets from user to user where the users each have financial limits, at least one service profile, application needs, and make user-to-user dynamic resource reservations. Further the users transmit data in the form of data packets having headers, configured for the inclusion of delivery-related data markings. The data packets are delivered from user to user the nodes that make up the network. In one embodiment the network is a computer network having dynamically allocated network resources. These resources include data transmission bandwidth and processor capacity. Further the computer network includes a plurality of node systems. The node systems include a source node system, which is where a signal originates and a destination node system, which is the signal's destination. The signals travel, in part via a network cloud comprising. This network cloud includes a plurality of edge elements connected with the plurality of node systems such that each node system is connected with at least one edge element. Further each edge element includes plurality of interconnected core routers, wherein the plurality of interconnected core routers is connected with the plurality of edge elements such that each of the edge elements is connected with at least one core router and such that each node system in the plurality of node systems is communicatively connected with each other node system in the plurality of node systems by a path through the network cloud. Additionally, the network resources are monitored and are configured to provide a plurality of predictable and dynamically variable quality of service levels, with each quality of service level guaranteeing a particular combination of network resources and including a price of service. The price of service of each quality of service level is set to optimize the admission of transmission data through the network and to avoid congestion within the network. The entire system allows users of the network to use node systems to transmit data to other users using other node systems in the network. Transmission takes place through the network cloud, enabling the users to dynamically select a quality of service level depending on their needs and ability to pay the price.

In another embodiment, the method an apparatus for pricing-based quality of service responds to a user that attempts to utilize resources beyond that user's financial resources by either ignoring the transmission, sending the transmission at a lower level service or sending the transmission as best effort traffic.

In another embodiment the method an apparatus for pricing-based quality of service the network is configured such that the nodes communicate with the network cloud using wireless communication. For example, a user might use a wireless node to contact a edge element, which might

DETAILED DESCRIPTION

Figure 1:
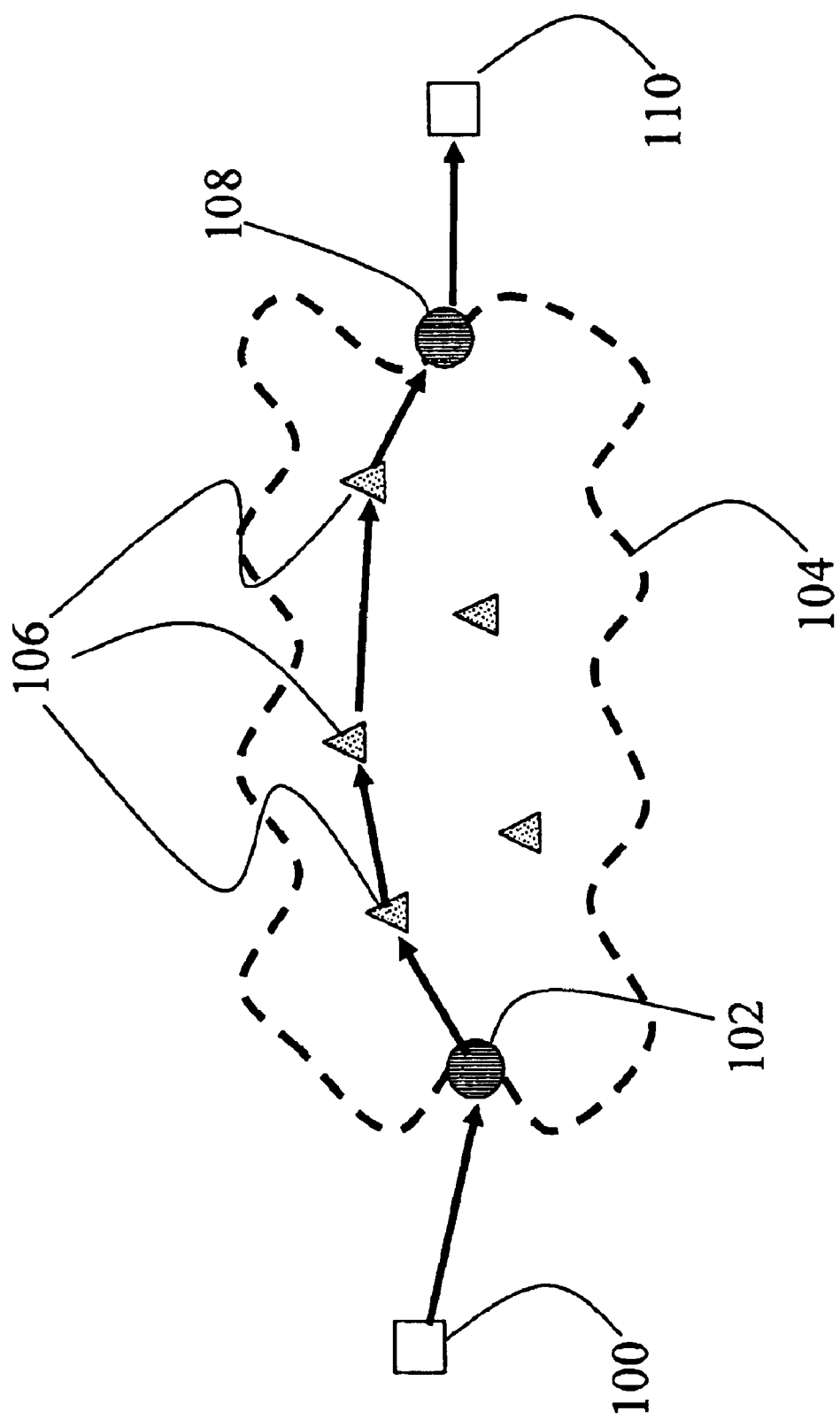
FIG. 1 is an illustration of an example of an end-to-end network reservation.

The present invention is related to a network system, and more specifically to a system for pricing-based quality of service control in networks. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

Introduction

The present invention includes several aspects, which are briefly introduced here. First is the basic architecture and design of the pricing-based quality of service (PQoS). In essence, one basic objective of PQoS is to provide network users with the means for making dynamic bandwidth reservations that are suitable for their financial limits and their applications' needs. The protocol's architecture requires that sources and destinations keep their data transmissions within an allocated bandwidth class. Packets that are sent in excess of the allocated bandwidth are relegated to a lower service class or are ignored. Scalability will also be discussed, especially with respect to how the core routers only need to maintain per-flow state information for a short period of time, thus allowing for increased scalability.

The PQoS protocol includes a plurality of messages, which are discussed in greater detail in Basic Architecture and Design Goals section, which focuses on issues of signaling and maintaining data flow reservations. Here PQoS control messages can be divided into three generic types: request, acknowledgement, and router messages. Each type is then subdivided into additional types that govern how they are processed at the end systems and routers.

PQoS has a plurality of phases including a query phase, where the source starts the reservation procedure by issuing a QUERY packet. With the QUERY packet, the source indicates the QoS level it is requesting, the amount of resources to reserve and some pricing information. The next phase is the reservation phase; WHEREIN the source requests a specific amount of resources from the network. The update phase, keeps the end systems informed about matters regarding resource availability and prices. In order to keep the updates current, end users periodically send REFRESH messages. The deletion phase is the final phase and is used to release resources allocated to a data flow. The source should issue a DELETE message before ending the session.

Implementation issues related to the PQoS are discussed next. In order to differentiate between data and control traffic, use of a different port number is adequate for the case of unicast transmission. For the case of multicast, destinations should not be allowed to receive the multicasted data flow before establishing a reservation for the data flow.

A PQoS system includes a plurality of pricing-based services, which are generally configured to a particular network to increase the price of bandwidth as it becomes scarce. This ensures that only higher priced or more important data enter the network during congestion periods.

One embodiment of the present invention provides a quality of service (QoS) model relying on a pricing-based QoS architecture (PQoS): Flexible and simple to implement. An overview of a simple communication scenario is provided in FIG. 1, which depicts an end node-to-end node reservation example. A node, for the purposes of this description, is understood to mean virtually any element in the network that is configured to facilitate the transmission and reception of data. In this scenario, a source node 100 sends its control message, which transmits periodic control messages to collect information about the resource availability in the network and the path taken by the flow, to an ingress edge element 102 of a differentiated services PQoS cloud 104. The control message is then forwarded along the core routers 106 in the PQoS cloud 104 until it reaches an egress edge element 108, which forwards it to the destination node 110. The pricing-based quality of service cloud 104 indicates the portion of the network in which the core routers support the PQoS protocol. More specifically, the architecture allows for the establishment of a data flow when a source node 100 transmits a reservation packet to an ingress edge element 102. Each ingress edge element 102 polices the incoming traffic and collects data flow information. The ingress edge element 102 is not expected to, and does not handle a large number of data flows. A quality of service differentiation is realized by marking data packets of different data flows differently, in accordance with the amount of resources allocated for those flows. The ingress edge element 102 registers the reservation and forwards the request to the first of the core routers 106. The core router 106 evaluates the service level required, as indicated by the packet marking and the available resources. Based on this evaluation, the core router 106 will either reject, accept, or modify the received request, indicate the price for the requested level of service, and forward the reservation to the next hop along the path to the destination, where the process is repeated until the reservation packet reaches the destination node 110. The destination node 110 then sends a feedback message to the source 100 indicating the result of the reservation attempt. In the absence of a feedback message during some pre-defined period, the source 100 reinitiates its reservation request. After successfully establishing a reservation, the source 100 transmits periodic control messages to collect information about the resource availability in the network and the path taken by the flow. This allows the source node, or source 100 to detect changes in the network load state and, if necessary, adjust its resource consumption based on this information. This adjustment is necessary when the price of network resources has gone up, usually as the result of an increased network load or some other reduction in network resources. Additionally, the originating node, or source node 100 and destination node 110 can detect path changes and initiate a new reservation sequence for the changed path.

This basic architecture allows users to make data flow reservations while keeping the core network routers relatively unencumbered. Issues related to policing traffic and collecting data flow information are handled at edge elements. Quality of service differentiation is realized by marking data packets of different data flows differently in accordance with the amount of resources allocated for those data flows. An important aspect of the present invention is that only temporary data flow state information is stored at the network's core routers during QoS reservation setup, QoS reservation tear-down operations, and per-hop acknowledgements of reservation setup and tear-down operations between the core routers. End systems collect information describing the reserved quality of service, the participating end systems, and the path taken by the reservation session. By periodically updating this information, the end nodes can detect path changes or path node failures.

The present invention presents an example of services that account not only for the needs of the network user but allow a network provider to provide services with predictable prices and still be able to use congestion-based pricing approaches to prevent a complete sell out of its resources, which would necessitate the network provider's rejection of new service requests.

Basic Architecture and Design Goals

A primary objective of the present invention is to provide end users with a way to make dynamic network resource reservations that are suited to their financial limits and applications needs. These reservations are made on an end-to-end basis without the need to keep state information at the core routers in the network. For the network provider, pricing-based quality of service provides a simple network architecture that allows quality of service differentiation while simultaneously incorporating the admission control and congestion avoidance into the pricing schemes. Network resources are allocated dynamically when they are needed so that the network provider can allocate network resources more efficiently and provide predictable quality of service levels without over-dimensioning the network.

Protocol Architecture

The present invention utilizes some techniques that find analogies in a differentiated service model. The edge elements maintain detailed per-flow state information, which includes the amount of consumed network resources, quality of service level, and flow identity. Admission control, and traffic policing and traffic shaping is mainly realized at the edge elements. Data packets that are sent in accordance with the reserved network resources for a particular source's flow are marked as belonging to a specific service class, and are sent to obey the source's service profile. Packets sent in excess of the reserved network resources violate the source's service profile, (which was established during the reservation setup), and are either dropped, marked with a lower service class, or sent as best effort traffic. Each of the data packets includes a mark. The mark can be made by either the source node, which has knowledge concerning the importance of the single packets, or by the edge elements, which have knowledge about the aggregate rate of the data traffic generated by the source node. In either case, the edge elements need to implement policing and/or shaping mechanisms to assure the conformity of the data flows to their reserved network resources. Furthermore, the present invention is directed toward issues of establishing and maintaining reservation packets, and is not emphatically concerned with the actual realization of service differentiation at the core routers. Therefore, reference to the sum of the requested resources as simply "bandwidth" will not adequately detail how the users should describe their quality of service requirements. Depending on the desired granularity of service and the implemented scheduling schemes at the core routers, different implementations of pricing-based quality of service, may utilize different designations for a quality of service level. Such designations might include: mean bandwidth, maximum bandwidth, burst length, or the designation may simply enumerate the flow type. In any case, every quality of service description needs to be translated into bandwidth requirements, and buffer requirements at the core routers. Generally, buffer costs are dwarfed when compared to bandwidth costs. Consequently the bandwidth will generally comprise a majority of the resources utilized by the invention.

To enable end users, located at the origination node and destination nodes, to dynamically signal their requirements and have dedicated resources adjusted in accordance with their actual needs, the pricing-based quality of service is configured to extend the service models with both an end-to-end signaling scheme, and a hop-by-hop signaling scheme.

In the case where a control messages gets dropped in the network, the end systems and core routers need to determine up to which core router a reservation packet was processed before getting discarded. In this situation, hop-by-hop signaling is often advantageously utilized. Simply reissuing a reservation packet in response to the loss of a previous reservation packet could lead to duplicate reservations at nodes where the first request was already successfully processed. To avoid the case of duplicate reservations, a combination of end-to-end and hop-by-hop signaling is used. Where end-to-end signaling is done across the entire communication path and hop-to-hop signaling occurs from node to node, as opposed to over the entire traversed path, the combination of end-to-end signaling and hop-to-hop signaling will be accomplished by having each core router append its address to an address list carried by the reservation packet. In the PQoS system each reservation message has an address list to which each core router through which the message packet passes appends its address. After receiving a reservation packet, the core routers maintain state information indicating the identity of the flow. The requested resources and address list are carried in the request message packet. Additionally, a timer is carried, which indicates when the request data becomes obsolete. In periods symbolized as $T_{router}$, the core routers inform their upstream neighbor core routers (the most recent sources of signals) about all reservation packets they receive. Upon receiving a confirmation that the downstream (the most recent destination node) core router received a reservation packet $Q_m$, the core router deletes the entry for that request from its own self maintained list. If the timer associated with a request ($Q_i$), which was received from core router, $R_l$, expired at core router, $R_{l+1}$, $R_{l+1}$ includes in its periodic messages to $R_l$ a negative acknowledgement with the address list and QoS information of $Q_i$. The negative acknowledgement is then forwarded along the core routers indicated in the reversed address list of request $Q_i$. Hence, the source of $Q_i$ would finally receive a message indicating the nodes for which a reservation was successfully made. The source then can resend the reservation packet and include in it the list of addresses from the previous request. Core routers that find their address in this list do not need to establish a reservation for this request or maintain state information for the request.

Figure 2:
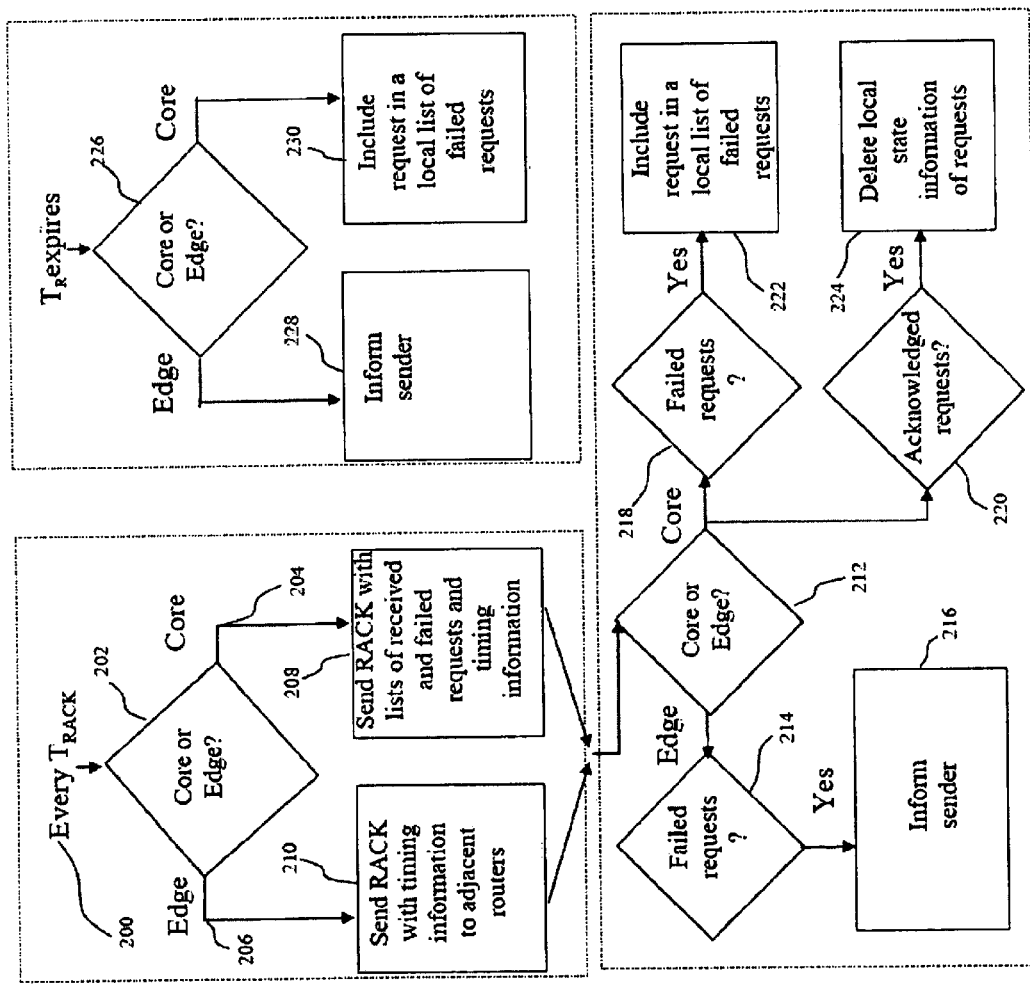
FIG. 2 is a flowchart depicting a hop-by-hop acknowledgment process at PQoS routers.

The hop-by-hop acknowledgement process at PQoS core routers is presented in FIG. 2, where $(T_{rack})$ 200 is the maximum time that may elapse between the forwarding of a reservation packet and a deletion request between a first core router $(R_i)$ and a second core router $(R_{i+1})$ and the reception of an acknowledgement for that request. Every $(T_{rack})$ 200 is submitted to a decision step 202, where it is classified as belonging to either a core router 204 or an edge router 206. Note that the term "edge router" shall be understood as including an ingress edge element and an egress edge element. If classified as belonging to core router 204 the $(T_{rack})$ 200 is sent to a core handling step 208 where a RACK is sent with lists of received and failed requests and timing information. If classified as belonging to an edge router 206 the $(T_{rack})$ 200 is sent to an edge handling element 210 where a RACK with timing information is sent to adjacent core routers. Regardless of whether classified as a core router 204 or an edge router 206, the RACK is received by at least one adjacent step 212. At this step the RACK is evaluated to determine if it belongs to a core router, or an edge router. For an edge router, a query is sent to a failed request query step 214, if there has been no failure, the query is dropped, otherwise the source is informed of the failed request 216. If the RACK belongs to a core router, a query is sent to a failed request step 218 and an acknowledged requests step 220. If either step answers in the negative the query is dropped for that step. If the failed request step 218 generates an affirmative output then the request is included in a local list of failed requests 222. If the acknowledged request step 220 generates an affirmative output then delete local state information of the request 224. If the $T_R$ expires, then the query again goes to a core or edge determination step 226. If determined to be from an edge element, inform the source 228, if determined to be a core router include the request in a local list of failed requests 230.

A successful reservation is indicated by a positive acknowledgement by the destination node, in this case the destination node. This acknowledgement needs to be intercepted by the edge element in order to initiate the policing and shaping functionalities. The amount and level of reserved resources is translated to a data transfer rate having a specific quality of service level. Traffic belonging to a flow with a reservation is marked, based on the requested quality of service level and the node's compliance with the requested level, i.e. the node complies by not sending data in excess of its service level.

Scalability

Generally core routers that are configured to provide integrated service need to maintain state information for each data flow for the purposes of classifying the flow to a certain quality of service level, and scheduling the flow with a specific quality of service level. Quality of service relates to a variety of elements. However, assured bandwidth, and service with a high degree of time linearity are often included as important elements in setting QoS. Time linearity is important for telephony and video conferencing, and other applications where real-time delivery of streaming media are required. Additionally, information indicating the state of the data flow and the resources dedicated to that flow must be maintained. By restricting the number of quality of service levels, for instance only telephony, and video conferencing, and using marks in the packet headers to indicate the level to which a packet belongs (here video or audio), it is possible to reduce the complexity of classifying packets. In this situation, the core routers only need to read the markings and assign the packet to the appropriate quality of service level. The pricing-based quality of service core routers need only maintain data flow state information for a short period of time; specifically, during the establishment of reservations and the subsequent update adjustment periods.

The pricing-based quality of service does not support the merging of destination node replies at intermediate core routers. This means that each reservation packet or update triggers an acknowledgement by the destination nodes. In some situations this is undesirable. Depending on how often control messages are sent, and the size of the multicast group and multicast group's distribution, several options can be applied to reduce the control traffic. First among the options is suppression. For the case of a multicast tree with many destination nodes that are attached to a small number of nodes the acknowledgements would carry similar contents. To avoid transmitting several similar acknowledgements, each destination node schedules the transmission of its acknowledgement packet after some randomly chosen time period. If an acknowledgement form another destination node with similar content was seen during this period, the destination node suppresses the transmission of its own acknowledgement. Alternatively, it is possible to utilize a unicast transmission. Wherein, for the case of multicast groups with relatively few destination nodes distributed over a wide area, using multicast for distributing the acknowledgements would only generate unnecessary overhead. A more efficient solution unicasts the acknowledgements form the destination nodes to the source node directly. In addition to the end-to-end control messages used by pricing-based quality of Service, core routers exchange hop-by-hop messages among each other. However, as each core router only periodically transmits a message to its neighboring core routers the overhead is small and does not have a meaningful correlation with the number of data flows.

Protocol Messages

There are three generic types of pricing-based quality of service protocol messages: request messages, acknowledgement messages, and core router messages. Each type may be further subdivided into additional types that govern how they are processed at the end systems and core routers. Each type is discussed below.

1. Request Messages

All request messages have the same general structure, whereas some fields might only be of relevance to some specific subtypes. The request messages preferably contain the following fields:

1. Type (T): Type of the message, such as telephony.
2. Flow id ($I_d$): A number indicating the flow's identity. This field is determined by the application prior to initiating the reservation session. $I_d$ needs to be set to a unique value to distinguish it from other reservation sessions the application might be using. All control messages used for a reservation session would then use the same identity.
3. QoS level ($Q_l$): The requested level of service.
4. Bandwidth ($B_{req}$): A description of the resources in the specified QoS ($Q_l$) level to be reserved. This field is initialized based on the requested service and application requirements. The actual format and contents of this field depend on the implementation of PQoS.

5. Price (P): The price of the resources to be reserved. This field is initialized based on the requested service and application requirements. The actual format and contents of this field depend on the implementation of PQoS.
6. Price fraction ($P_{frac}$): In cases where the price of the reserved bandwidth is to be divided between the source and destination nodes the source can indicate in this field the share the destination node needs to pay. In cases where the source is to pay for all reserved resources this field is initialized to 0.
7. Delay ($T_{delay}$): A field for collecting or indicating the maximum time between forwarding a reservation or deletion request and receiving a negative acknowledgement for it.
8. Timestamp ($T_{send}$): A timestamp set by the source to indicate the time at which the packet was sent. Depending on the type of the request message, as well as the specific embodiment, there might optionally be additional fields in the control message.

The Query Message (QUERY)

Before transmitting the actual reservation packet, the source needs to query the available resources in the network and the prices assigned to those resources, as well as delay information needed for the reservation step. The type of this message is set to QUERY.

The Reservation Packet (RESV)

With the Reservation packet, RESV, the source, here the source node, issues an actual reservation packet. The type of this message is set to RESV. In addition to the fields of the generic request message, the Reservation packet, RESV, contains the following fields:
1. Routing list length ($N_{router}$): Indicates the number of core router addresses in the routing list. This field is initialized to 0 at the source and increased by one for each traversed core router.
2. Routing list ($L_{router}$): This list indicates the address of the core routers already traversed. $L_{router}$ is set to empty at the source and then each traversed core router appends its address to the transmitted packet.
3. Repeated routing list length ($N_{router\_old}$): In case this Reservation packet, RESV, was sent in response to a to a lost reservation packet, this field indicates the number of core routers successfully traversed during the previously lost reservation packet. Otherwise, $N_{router\_old}$ is set to 0.
4. Repeated routing list ($L_{router\_old}$): In case this Reservation packet, RESV, was sent in reaction to a loss indication of a previous reservation packet, this list indicates the address of the core routers traversed by the previously lost reservation packet. Otherwise, is $L_{router\_old}$ set to empty.
5. The Delete Message (DELETE): With the DELETE message a source node indicates that the network core routers should reduce or eliminate the amount of bandwidth reserved for them. The DELETE message has the same structure as the Reservation packet, RESV, but with the type set to DELETE. Additionally, in this case the bandwidth field is interpreted as the amount of bandwidth to be reduced and not reserved at the core router. Here, the repeated core router list ($L_{router\_old}$) and number ($N_{router\_old}$) indicate the routing information for the data flow issuing the deletion request.
6. The Reservation Check Message (RCHECK): As will be described later a source node might need to check if a reservation packet arrived at a destination node. For this purpose the source issues a request message with the type field set to RCHECK and the reservation information form the original reservation packet. In this case, the repeated core router list and number indicate the routing information for the flow issuing the RCHECK request.
7. The REFRESH (REFRESH) packet message: To keep the end systems updated in matters relating to the available resources and their prices, the source needs to periodically issue request messages with the type field set to REFRESH. In addition to the basic fields of a request message, REFRESH packets contain the following fields:
   a. Routing list length ($N_{router}$) message: Indicates the number of core router addresses in the routing list. This field is initialized to 0 at the source and increased by one by each traversed core router.
   b. Routing list ($L_{router}$): This list indicates the address of the core routers already traversed. $L_{router}$ is set to empty at the source and then each traversed core router appends its address to the end of the list.
   c. Reserved resources ($B_{resv}$): This field indicates the amount of currently reserved resources for flow $I_d$ and is set by the source.

2. Acknowledgement Messages (ACK)

In reply to received requests destination nodes issue acknowledgement messages to inform the source nodes, about the results of their requests. In general, acknowledgement messages have the same structure as the basic request message. The quality of service and pricing information disclosed in the acknowledgement messages are generally taken from the request-for-service messages they are acknowledging. Additionally, the destination node might change the entry in the price fraction field to indicate how much the destination node is willing to pay, or reduce the reserved resources entry to reflect its capability in terms of data handling. Thus the destination node may negotiate with the source on how costs are split, and how much bandwidth is in the contract. In addition to the fields included in the general pricing-based quality of service message, ACK messages have the following additional fields:
   a. Path change flag ($F_{pc}$): Setting this flag to "on" indicates that the destination node detected a change in the path taken by the flow.
   b. Routing list length ($N_{router}$): Indicates the number of core router addresses in the routing list.
   c. Routing list ($L_{router}$): This list indicates the address of the core routers traversed by the request messages.

To avoid sending the complete routing list with each ACK message, the destination nodes only need to fill in the routing list and numbers ($L_{route}$ and $N_{router}$) when:
   i. detecting a change in the path taken by the control packets;
   ii. after joining a multicast session; or
   iii. after receiving a reservation packet.

3. The Router Messages

With pricing-based quality of service the invention combines end-to-end signaling with hop-by-hop router signaling. As such it is possible to distinguish between router-to-router messages and router-to-source messages.

The Router Acknowledgement (RACK) Message

To avoid duplicating a reservation or deletion operation the sources need to keep track of which routers a reservation or deletion message traversed before being dropped. For this purpose, routers maintain some state information that expires after a timeout. In periods of $T_{router}$ each router (n) sends RACK messages to all its neighboring routers (m) with the following structure:
1. Timestamp ($T_{stamp}$): The time this packet was sent by router n.
2. Buffer delay ($T_{B_n}$): The maximum buffering delay RACK messages from router m might suffer at router n.
3. Received timestamp ($T_m$): The timestamp of the last RACK message received from router m.

4. Acknowledgement delay ($T_{delay_m}$): The time elapsed between receiving the last RACK message from router m and sending this RACK message.
5. Number of received requests ($N_{req}$): The number of reservation or deletion requests that arrived at router n from router m since sending the last RACK message.
6. Request list: The identities of the reservation and deletion requests that arrived at router n from router m since sending the last RACK message. Each request is identified through the addresses of the source and destination node and the flow identification.
7. Number of failed requests ($N_{fail}$): Number of the requests that arrived at router n from router m and have expired since sending the last RACK message.
8. List of failed requests: A list containing the state information of the requests that either expired locally or were reported to have expired by other routers up-stream towards the destination node. The state information describing the failed request contain all the state information saved at the router where the request was timed out, i.e., the content of the request message for that flow indicating QoS, pricing, and routing information.

The Negative Acknowledgement Message (NACK)

If an edge element receives a RACK message with an entry indicating a failed request, the edge element needs to inform the source of this request about the failure. This is achieved by sending a NACK message to the source that issued the failed request indicating the identity of the request, the pricing and bandwidth information as seen by the last router to process this request, and the routing list, going in the direction of the last router.

The Query Phase

To establish a reservation via the network, the end systems must interact with the network. In the basic approach, as set forth above, the source transmits control messages to an edge element which forwards them into the network cloud, which in turn forwards them to another edge element and finally to the destination node. The edge elements need to receive and process all control messages whereas the core routers need only to react to the reservation or deletion messages.

Figure 3:
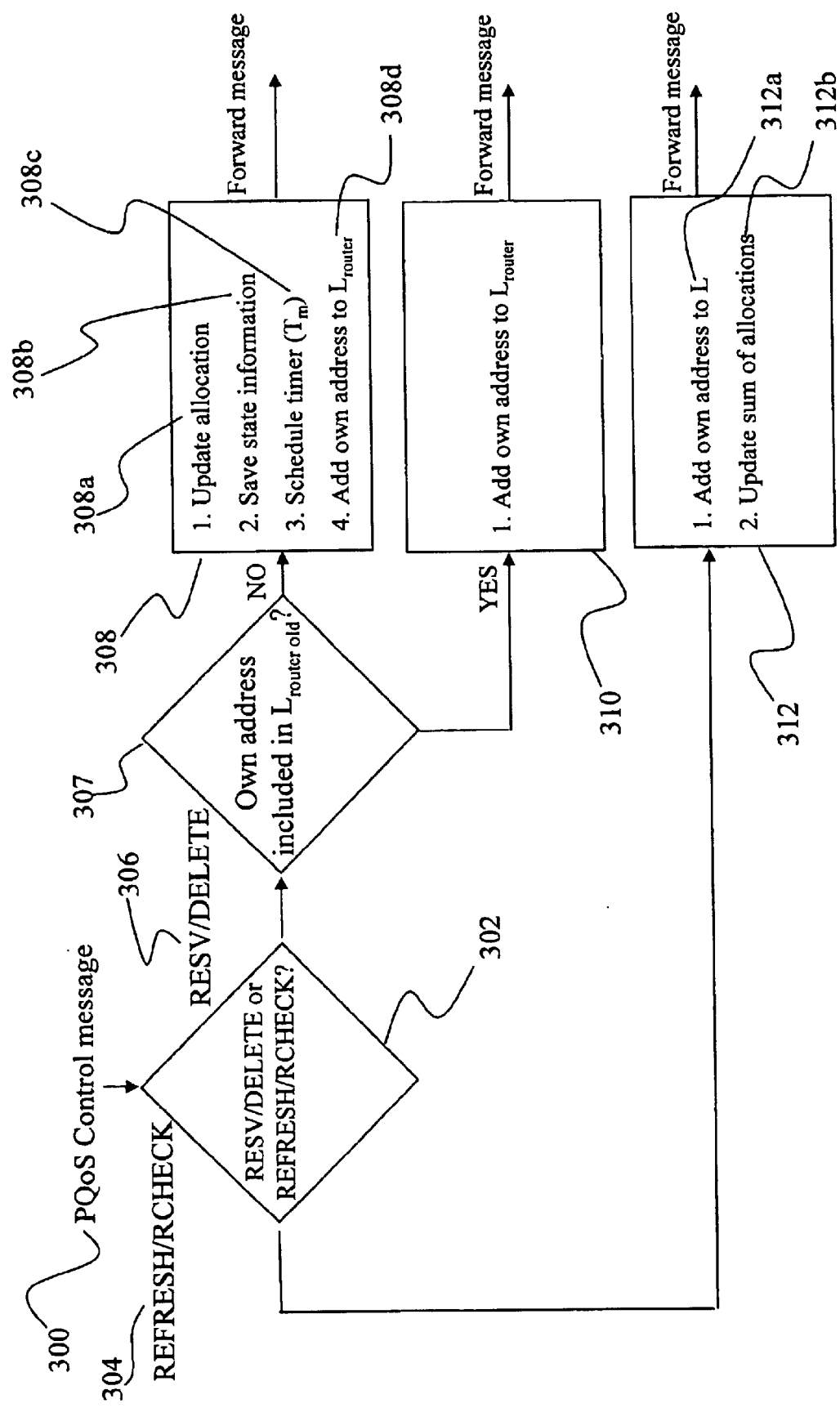
FIG. 3 is a flowchart depicting control message processing at PQoS routers.

The control message processing at the PQoS routers is set forth in FIG. 3, wherein, the PQoS control message 300 is submitted to a decision step 302. The decision step 302 classifies the control message 300 as either a REFRESH/RCHECK message 304 or a RESV/DELETE message 306. The node queries the RESV/DELETE step 307 to ascertain if its own address is included in the repeated routing list ($L_{router\_old}$) If not then the message is sent to the NO step 308, where the PQoS updates resource allocation 308a, saves system state information 308b, timestamps the last RACK message received from router m ($T_m$) 308c, and adds it own address to the routing list ($L_{router}$) 308d. The routing list ($L_{router}$) 308d indicates the address of the routers traversed by the request messages, from the source node to the destination node. Next, the message is forwarded to the next core router, edge element, or node. In the event that the node's own address is included in the repeated routing list ($L_{router\_old}$), then the node adds its own address ($L_{router}$) 310. If the initial decision step 302 classifies the control message as a REFRESH/RCHECK message 304, then the control message is sent to the REFRESH/RCHECK step 312 where the node adds its own address ($L_{router}$) 312a, and updates the sum of allocations 312b, and forwards the message to the next router, element, or node.

Figure 4:
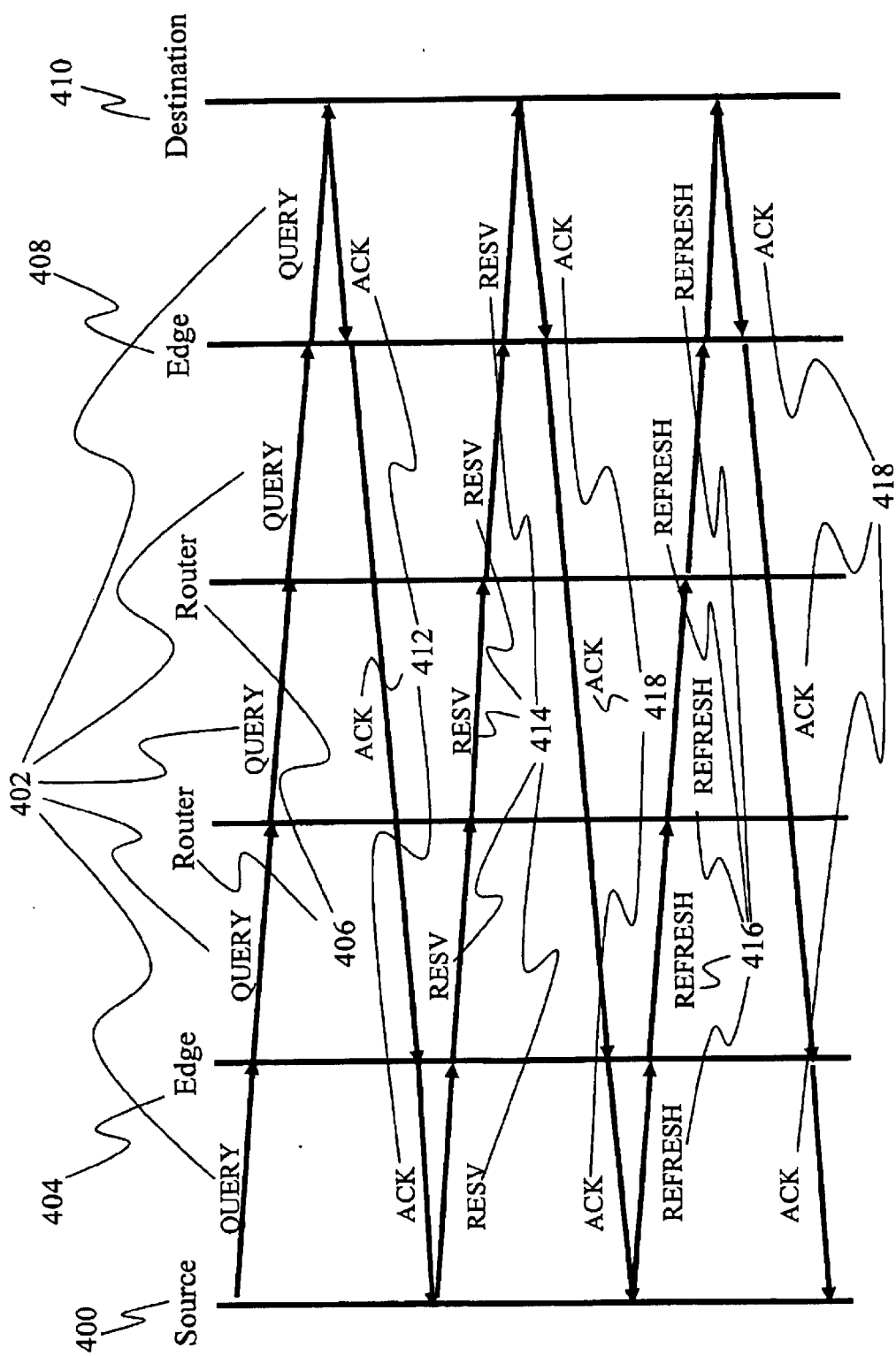
FIG. 4 is a schematic depiction of a network facilitated end-to-end reservation.

The preceding end node-to-end node reservation example is depicted graphically in FIG. 4, wherein the source node 400 starts the reservation procedure by issuing a QUERY packet 402 that travels from the source node 400 to the network ingress edge element 404. The QUERY packet 402 then travels through a plurality of routers 406 to the egress edge element 408 and finally to the destination node 410. With the QUERY packet 402 the source node 400 indicates the QoS level it is requesting, the amount of resources to reserve, and pricing information. Additionally, it specifies in the price fraction field of the data packet, the share of resources that the destination node should take on. Each traversed core router 406 controls the reservation packets indicated in the QUERY packet 402 and might change the bandwidth and pricing entries depending on the requested service and its load status. Additionally, each core router 406 adds the maximum time value ($T_{rack}$) it might take to send an acknowledgement packet for this request to the core router 406 from which this request was received. The details of determining the values of the different timers used with pricing-based quality of service will be described in a subsequent paragraph. When a QUERY packet 402 is received at the destination node 410, the QUERY message 402 contains the bandwidth and pricing fields, which indicate the current resource availability in the network. Although the resource request values may change before the source node 400 issues the actual reservation packet, they generally serve as a good indication of the resource availability and prices in the network.

After receiving a QUERY packet 402 the destination node 410 schedules an acknowledgement message (ACK) 412 after some time period (T) depending on the acknowledgement protocol. This acknowledgement message (ACK) 412 is sent from the destination node 410 back to the source node 400 via the egress edge element 408, the core routers 406, and the ingress edge element 404.

During the reservation phase the source node 400 requests a specific amount of resources from the network. There is no differentiation between new reservations or updates of a reservation. A source node 400 can at any time increase the amount of allocated resources by issuing a new reservation packet indicating the desired increase in resources. This is then treated as a new reservation at the core routers 406. Edge ingress elements 404 and egress elements 408, however, need to update their state information accordingly. Reservation packets 414, REFRESH packets 416, and acknowledgements 418 are all handled in a similar manner.

The Reservation Phase

Figure 5:
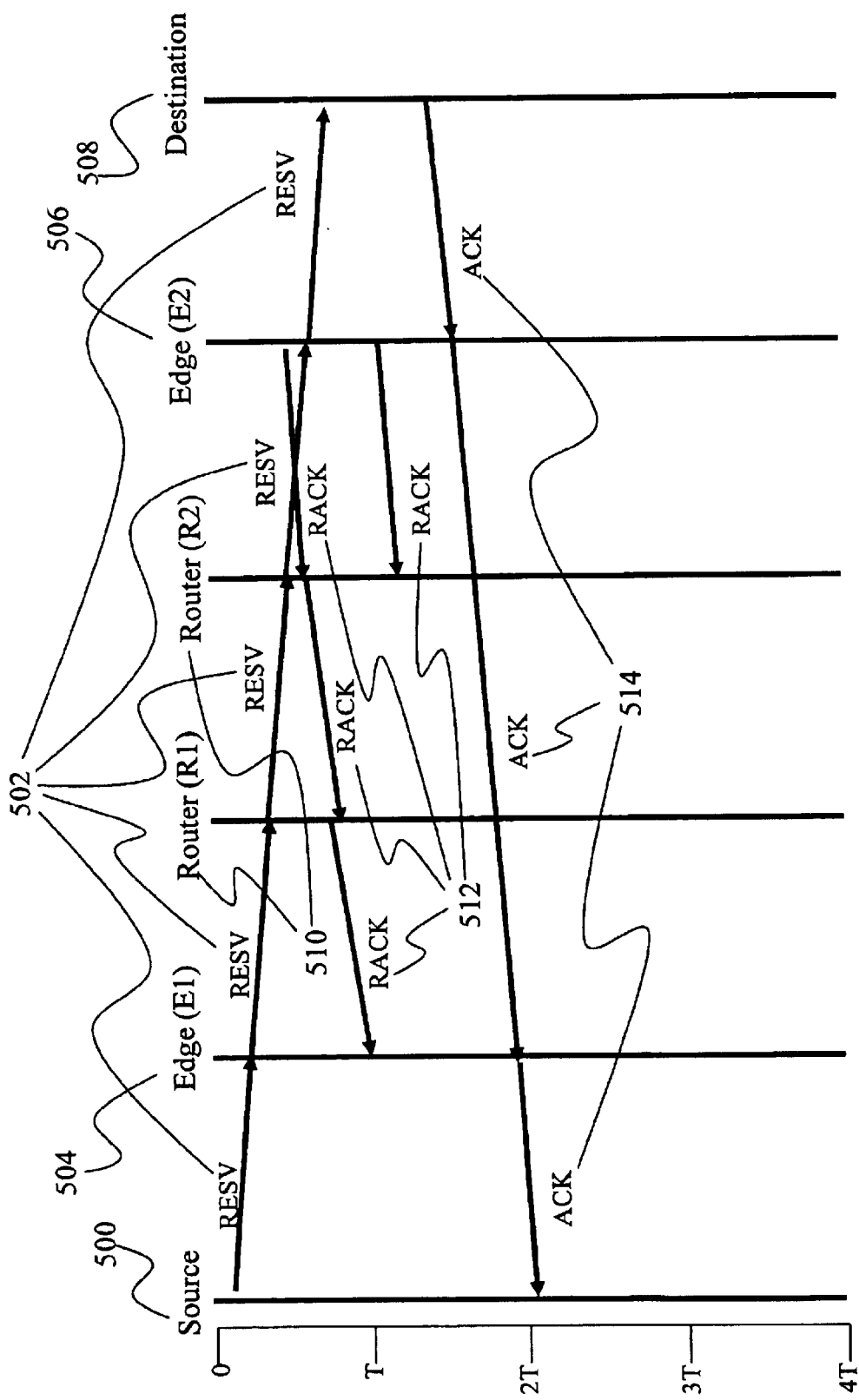
FIG. 5 is a schematic depiction of a successful resource reservation on a network.

An example of a successful reservation with T indicating the time between two router acknowledgement (RACK) messages is depicted in FIG. 5. After receiving an acknowledgement message for its query request, the source node 500 starts the actual reservation procedure by issuing a reservation packet (RESV) 502 indicating the requested QoS resources to reserve and pricing information. The pricing and bandwidth values determined during the query phase should be taken as guidelines to the actual resource availability and prices in the network. Additionally, the source 500 schedules a timer to expire after ($T_s$) seconds. The reservation packet (RESV) 502 is first sent to the ingress element 504, which checks if it has enough resources to admit the flow. If it accepts the flow, the ingress element 504 keeps state information about this request in the form of identification, QoS characteristics, and pricing information. Wherein the identification refers to the ingress element's 504 identification of packets belonging to this reservation packet 502 and using the addresses of the destination node 508, the addresses of the origination node 500, and packet data flow identification ($I_d$). The QoS characteristics include the QoS level and bandwidth requirements as noted in the reservation packet 502. The pricing information includes the edge elements' 504 need to maintain information regarding the cost to the source node 500.

Service differentiation is achieved by marking a packet as belonging to different QoS levels. This can either be achieved by marking the packets at the source node 500 or at the ingress edge element 504. In either case, the ingress edge element 504 is responsible for ensuring the conformity of the entering flows to their reserved resources. This entails using policing or shaping mechanisms that drop or reduce the priority of packets that are sent in excess of the reserved resources.

By intercepting acknowledgement messages and noting the information about the resource availability and prices in the network, the edge element can avoid the case of killer reservation. Killer reservations occur where a user requests a large amount of resources that get granted in a portion of the network. As a result new reservations are rejected within that portion of the network. The reservation is rejected at some other part of the network, which means that the resources reserved for that request are wasted, and consequently other requests were, potentially, unnecessarily rejected. By rejecting requests that do not conform to the query results, the effects of killer reservations can be reduced considerably. Further, the ingress edge element 504 schedules a timer to expire after $T_{R_E}$, and includes its address in the address list ($L_{router}$). The ingress edge element 504 increments the counter $N_{router}$ by one and forwards the message towards the next router on the path to the destination node.

Core routers 510 temporarily maintain state information describing reservation packets. After receiving a Reservation packet, RESV, 502, the core router 510 maintains a copy of the identification, QoS, pricing information, and routing information, which is carried in the Reservation packet, RESV, 502. This information, however, is only maintained for a maximum period of $T_{R_i}$ seconds. If during this period of time, the router does not receive a RACK message 512 acknowledging the reception of this request at the next router, along the path toward the destination node, the router considers this request as lost. This request is then added to the failed requests list in the next RACK message 512 destined towards the core router 510 from which the request was originally received, as indicated in the router list of the request. If a RACK message 512 is received, indicating that the next router received this request, before $T_{R_i}$ expires, the state information is deleted. Before deleting the information, the router 510 needs to make sure that it has acknowledged the reception of this request.

Before arriving at the destination node 508, the control messages may pass another edge element 506 that connects the PQoS network to either another network or the final destination node 508. The ingress edge element 504 needs to maintain state information describing the flow's identity, QoS and pricing information as well as the routing information as described in the received RESV packet 502 message.

At the destination node 508, the destination node acknowledges the receipt of the Reservation packet, RESV, 502 by issuing an ACK message 514. The ACK message 514 would usually contain the contents of the RESV packet 502. However, the destination node 508 might express its own preferences and capabilities by changing the entries for the reserved resources or the price fraction (or fraction of the communication costs) it is willing to pay. The path change flag ($F_{pc}$) is set off in this case.

The ingress edge element 504 and the egress edge element 506 use the ACK message 514 to update their state information for the request. The source controls the contents of the ACK message 514 describing the actual resources reserved, the prices of the resources, and the fraction of the price the destination node is willing to accept. If one or more of the reported values are not acceptable to the source it needs to delete the reserved resources by sending a DELETE message indicating the amount of resources reported in the ACK message 514.

In the event that either the acknowledgement packet (ACK) 514 or the reservation packet (RESV) 502 are dropped, the source 500 needs to determine the set of core routers 510 where it has already established a reservation in order to avoid duplicate reservations.

Figure 6:
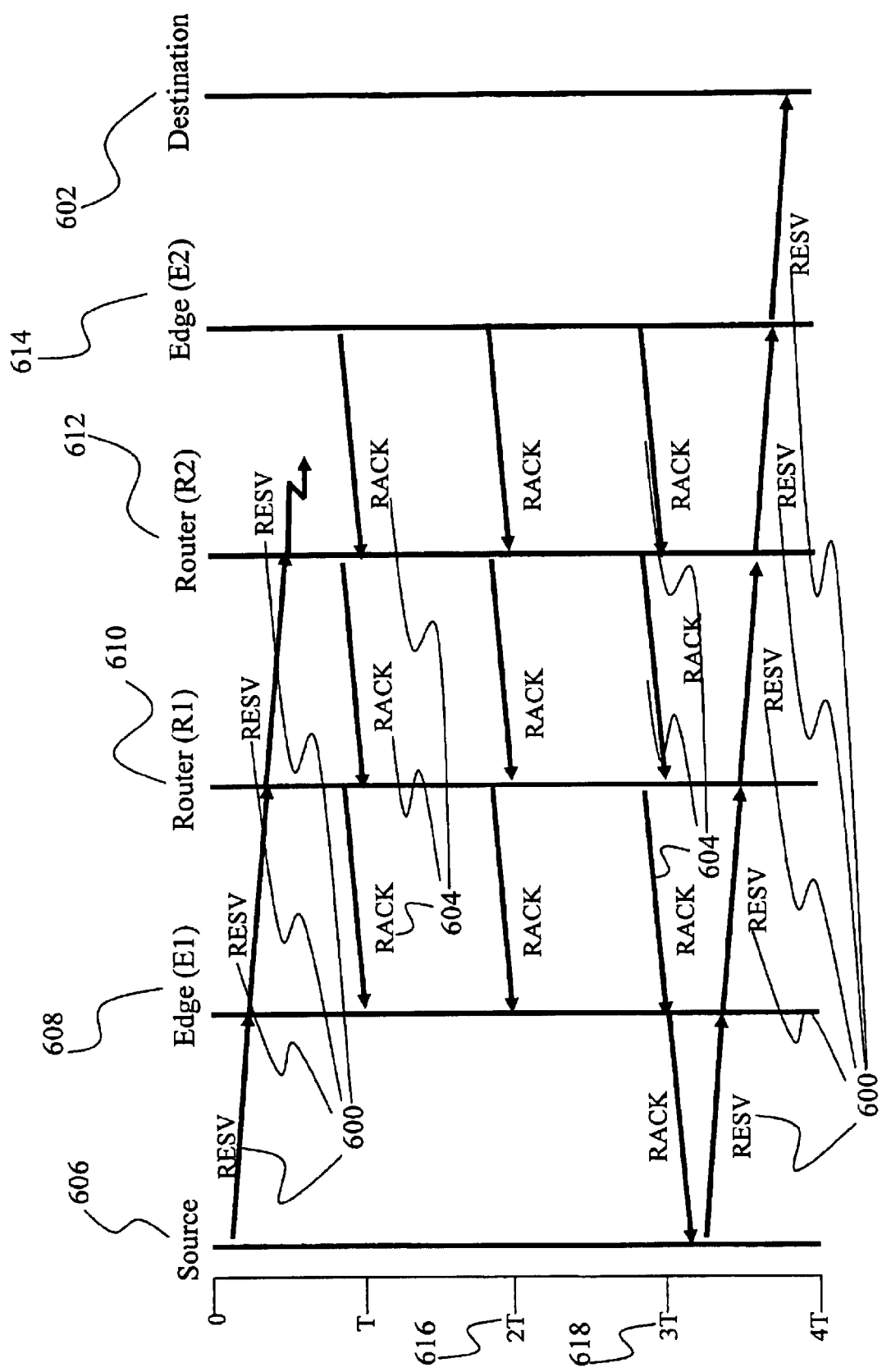
FIG. 6 is a schematic depiction of a failed resource reservation on a network.

The method used to avoid duplicating reservations is detailed in FIG. 6. Congestion errors and link errors may result in reservation packets 600 being dropped at some core router ($R_n$). Each router (i) keeps the state information for a request for a time period of $T_{R_i}$ before assuming that the reservation packet 600 was lost at a router further up-stream towards the final destination node 602. The reservation packets 600 are depicted in the form of (RESV (flow id, $L_{router}$, $L_{router\_old}$)) and the RACK packets 604 are depicted in the form of (RACK (flow id, $L_{router}$)). The reservation packet 600 originates at the source node 606, and then it successfully passes the ingress edge element 608 and the first router (R1) 610 but is dropped at a subsequent router (R2) 612. Each traversed router adds its address to the routing list ($L_{router}$) and maintains state information about this reservation packet 600 for a period of time ($T_{R_i}$). Each T seconds the routers transmit a RACK packet indicating the received and failed requests. In the event that no requests were received or, or all the requests have succeeded, the lists of the RACK packets 604 are empty, e.g., the RACK packets 604 of edge element 2 (E2) 614. In case a request was successfully received, the RACK packets 604 indicate the identity of the flows in the request list field, e.g., the RACK packets 604 of R1 610 and R2 612. Assume that the timer of R2 612 ($T_{R_2}$) for the request of the flow of identity 1 expires prior to time 2T 616. Hence, R2 612 includes in its RACK packets 604 the identity of the failed request and the contents of the routing list of that request as seen at R2 612. R1 610 forwards this information at time 3T 618 to the edge element that directly sends a NACK message to the source indicating the identity of the lost reservation packet and addresses of the routers successfully traversed by that reservation packet.

In response to a failed request, the source node 606 issues a new reservation packet with the QoS and pricing taken form the NACK message received from the ingress edge element 608 in response to the loss. While $L_{router}$ and $N_{router}$ are empty in the new request, $L_{router\_old}$ and $N_{router\_old}$ have the values of the routing list and length indicated in the NACK message. At each core router, the core routers check if their own address was included in the $L_{router\_old}$ list attached to the Reservation packet, RESV. If the core routers find that their address was included in the $L_{router\_old}$, they can assume that they already made a reservation for this request and need only forward the reservation to the next router on the path towards the final destination. Routers that do not find their address in the list need to follow the same procedure as is followed for a new message where there were no losses. In the situation where the flow's path changed in between the transmission of the first reservation request and the retransmission of that request, the resources reserved on routers that are no longer traversed are lost. This situation needs to be accommodated in determining the amount of reserved resources for the admission control procedure.

If the source node 606 receives no answer to its transmitted reservation packet after a timeout period of $T_s$, it issues a reservation packet check request (RCHECK) with $L_{router}$ set to empty. Each traversed core router appends its address to the address list ($L_{router}$) and forwards the packet towards the final destination node 602. In case the original request reached the final destination node 602, the final destination node 602 would have maintained an entry for the request and the routing information for it. In such a situation, the final destination node 602 compares the route information in the received RCHECK ($L_{router}$) message with the information it collected from the original Reservation packet, RESV. If both lists are identical, then the final destination node 602 issues an ACK message with the routing list included in the RCHECK message, otherwise it needs to issue an ACK message with the path change flag set to the "on" position and the old routing list. In such a case the source 606 issues a reservation packet with $L_{router\_old}$ set to the routing list indicated in the ACK message. Only the traversed core routers that are not included in the $L_{router\_old}$ list need to establish a new reservation for the session. The resources reserved with the first RESV request on the routers that are no longer traversed are wasted until the estimator for the allocated resources on those routers converges to the actual value of allocated resources.

In case the final destination node 602 does not receive the Reservation packet, RESV, in the first place, it sends an ACK message with the path change flag set off and an empty routing list. This indicates to the source 606 that it needs to issue a new reservation packet.

The Update Phase

To keep the end systems informed about the resource availability and prices and to avoid using hard state protocols in the routers for estimating the amount of established reservations, the end nodes need to periodically send REFRESH packets. Each traversed core router includes its address in the routing list, updates the pricing and resource availability information and forwards the message towards the next core router on the path to the final destination node 602. The final destination node 602 compares the routing list of the received REFRESH packet with its local copy determined during the reservation operation. If both lists are identical, then the destination node issues an ACK message with an empty routing list, otherwise it needs to issue an ACK message with path change flag ($F_{pc}$) set on and the new routing list. The includes the new routing list and sets $F_{pc}$ in all of the ACK messages until it receives a reservation packet for the new path indicating that the source has received the new path correctly.

After receiving an ACK message with the path change flag set on, the source issues a reservation packet with $L_{router\_old}$ including the addresses that were common to its old list and the new one received in the ACK message. Thereby, only the new routers on the new path to the destination node need to establish another reservation. In case the ACK message was a repetition and the source had already started the reservation phase for the newly changed path, the ACK message is ignored.

The Deletion Phase

To release resources allocated to a data flow, the source should issue a DELETE message before ending the session. To ensure that resources are only deleted at core routers for which this flow actually made a reservation, the source includes the routing list of the flow in the $L_{router\_old}$. Each traversed router that finds its address in the $L_{router\_old}$ list reduces the value of the allocated resources by the amount indicated in the delete message and then forwards the reservation packet to the next router towards the destination node. DELETE messages are treated at the core routers similar to Reservation packets, RESVs. That is, they are acknowledged with the RACK messages. In case a DELETE message is lost, the source receives a NACK message indicating up to which point the deletion operation was successful. In this case it needs to resend another DELETE message.

For the case of reservation packets, $L_{router\_old}$ indicates the list of routers where a reservation has already been established. For the case of deletion, $L_{router\_old}$ indicates the routers where the deletion operation still has not been processed. Hence, $L_{router\_old}$ indicates here the list of routers included in the path traversed by the flow and not included in the NACK message.

Using source-based routing in conjunction with the delete operation can be of great value in reducing the waste of resources due to changes in paths. That is, after a change in path, the source needs to make a new reservation on all newly traversed paths and the resources reserved on the parts of the old path that is no longer traversed are wasted. Using source-based routing, the source can send a delete packet with routing list ($L_{router}$) set to the old path and $L_{router\_old}$ including the addresses of the routers that are no longer traversed. Each router would then forward the DELETE packet not based on its current routing table but using the routing information in $L_{router}$. Each router that finds its address in the $L_{router\_old}$ needs to delete the amount of resources indicated by the DELETE request.

Thus far the invention has been described as it relates to the unicast case i.e. the case where there is one source node and one intended destination node. The invention also has application in a multicast capacity. In such a situation, destination nodes can join a session much later than the source. In the multicast case, the new destination node needs to wait for a REFRESH packet and send an ACK message with the path change flag set to "on", and the routing information indicated in the REFRESH packet. After receiving the ACK message from the new destination node the source needs to issue a Reservation packet, RESV, towards that destination node. To avoid duplicate reservations, the source maintains a two dimensional list with one axis having the addresses of all the routers traversed by the multicast packets and the other axis listing all destination nodes. Each entry of this list indicates if destination node X is traversing core router Y. In case a new destination node joins the session, the source checks the routing list toward the destination node as indicated in the ACK message and determines which routers are new to its list. A reservation is then only required for those new routers. That is, the source issues a Reservation packet, RESV, with its $L_{router\_old}$ list listing all the routers on the path toward this destination node that are already included in the paths to other destination nodes. In case the source does not get an ACK message from some destination node over a period of time, the destination node is considered as having left the session and the source is configured to delete the resources reserved for this destination node. If source routing is supported, a DELETE message is sent towards the destination node with its $L_{router\_old}$ list indicating the list of routers traversed only by the failed destination node and $L_{router}$ indicating the routing list toward that destination node. Routers that are included in the $L_{router\_old}$ list should then delete the resources as indicated in the DELETE message.

Figure 7:
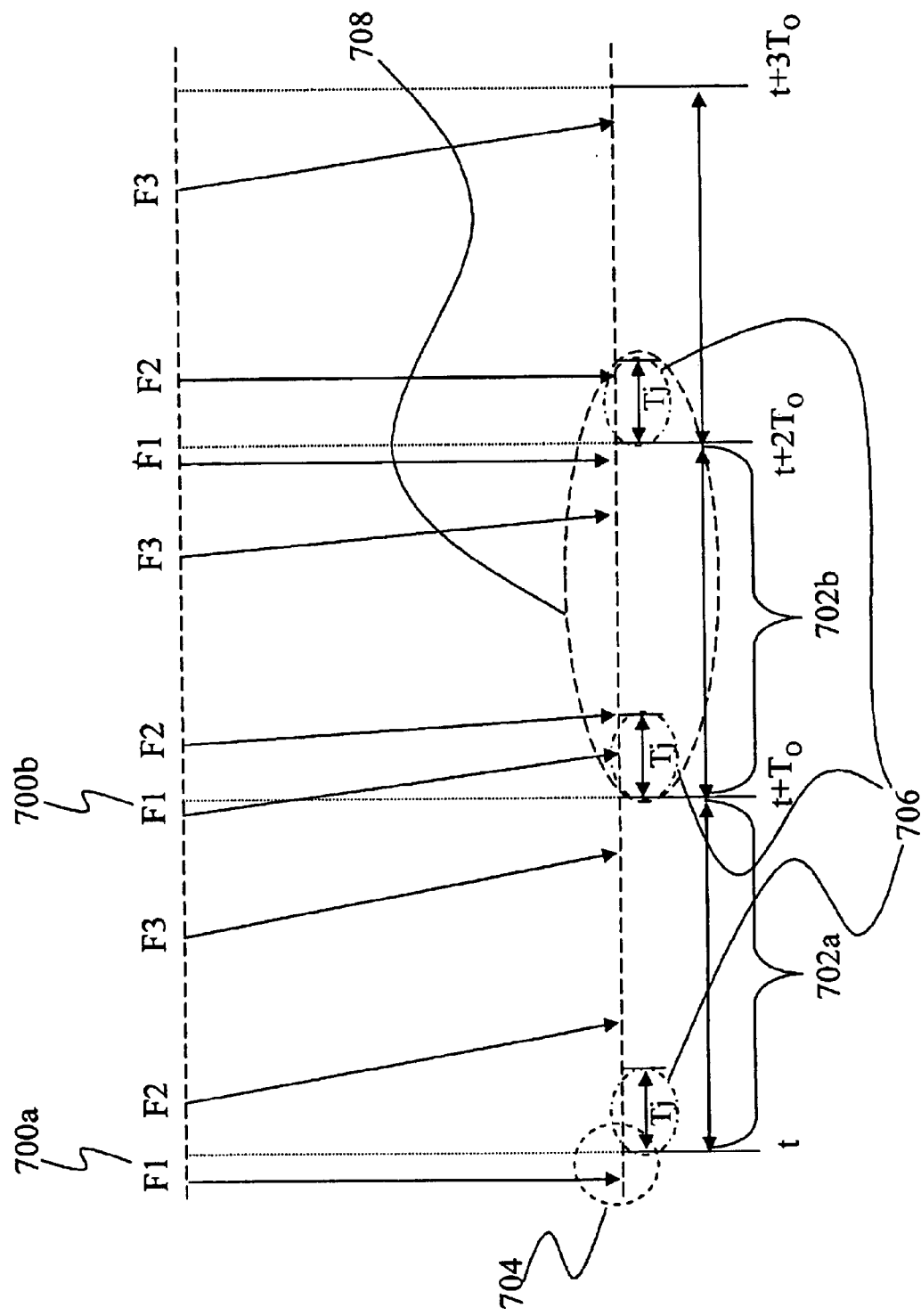
FIG. 7 is a schematic depiction of a scenario for determining the amount of reserved resources.

In either the multicast or unicast state, the PQoS system does not require the core routers to store voluminous amounts of data. Rather the core routers need only maintain information about the sum of the already reserved resources for all the flows. While maintaining the exact sum of the reserved resources could be achieved using the information in the RESV and DELETE messages, relying on explicit deletion messages might lead to inconsistency problems. Some problems might arise due to loss of DELETE messages, node failures, path changes or incomplete PQoS implementations that might not generate DELETE messages. Therefore, PQoS utilizes the REFRESH packets for estimating the amount of reserved resources. Consider FIG. 7, which depicts the case of flow F1 700a, and a scenario for determining the amount of reserved resources. The sources transmit a REFRESH packet every $T_o$ seconds indicating the amount of reserved resources for their flows ($B_{resv_i}$). Hence, the sum of all values of $B_{resv_i}$ of all flows in an interval of $(t, t+T_o]$ 702a would represent the total amount of reserved resources ($R_{resv}$) during this time period.
Where:

$$R_{resv} = \sum_i B_{resv_i}$$

However, due to the jitter in the buffering delays the packets might face, a router might not receive REFRESH packets from all flows in the interval of $(t, t+T_o]$ 702a. The first REFRESH packet of this flow is received just outside the observation interval 704 of $(t, t+T_o]$ 702a. In the second instance, the flow, F1, 700b is sent exactly $T_o$ seconds later and is received $(T_o+T_{j1}: T_{j1} \leq T_j)$ seconds later and hence falls in the interval $(t+T_o, t+2T_o]$ 702b. To accommodate this situation, the routers need to take late arriving REFRESH packets into consideration as well. Setting the maximum possible delay jitter to $(T_j)$ 706, the routers need to determine $R_{resv}$ during an interval of $(t, t+T_j+T_j)$. The $R_{resv}$ determined this way is actually an upper bound on the already reserved resources in the interval of $(t, t+T_o]$. As REFRESH packets are sent in periods of $T_o$, the routers need to start a new observation period every $T_o$ as well. However, as the observation periods need to be $(T_o+T_j)$ 708 long in order to consider late arrivals, $R_{resv}$ might include duplicate REFRESH packets from the same flow. As the figure shows, during the interval $(t+T_o, t+2T_o]$ the REFRESH packet of the flow, F1, 700a is counted twice. While this may lead to underutilization of the routers, it gives an upper limit on the reserved resources and prevents routers from admitting new flows unless there are assured adequate resources to accommodate their needs. Utilizing such an approach, the average utilization level (U) of a router, may be approximated by:

$$U = 1 - \frac{T_j}{T_o}$$

In addition to the delay jitter problem, REFRESH packets might be dropped, and hence the bandwidth share consumed by these flows is not accounted for in the determination of $R_{resv}$. To reduce the effects of losses, the routers need to take the maximum seen $R_{resv}$ during a window of n observation intervals. Further, the core routers should not allocate all of their available resources (R) but reject new flows for the case where $(R_{resv} > R \times \sigma \cdot \sigma < 1)$. With the approach described here, the core routers start every period of $T_o$ seconds an observation interval of the length of $(T_o+T_j)$ 708. The routers maintain a variable describing the observed value in the last window of n observation intervals ($R_{resv_{old}}$) and a variable describing the maximum count of reserved resources measured in any of the observation intervals in the current observation window ($R_{resv_{current}}$). After receiving new reservation or deletion requests the routers need to increase or decrease $R_{resv_{old}}$ and $R_{resv_{current}}$ by the requested amount. Flows requesting B resources are then only admitted for the case of $$\max(R_{resv_{old}}, R_{resv_{current}}) + B < R \times \sigma$$

The source and core routers use timeouts for determining the loss of packets. That is, the source waits $T_s$ seconds before concluding that either the reservation packet or the acknowledgement for it was lost. The edge elements and core routers consider a reservation packet to be lost if it was not acknowledged by the next router upstream after $T_{R_i}$ seconds. When setting the values for the different timers, it is important to make sure that the source's ($T_s$) timer does not expire before any of the routers' timers ($T_{R_i}$) or while a negative acknowledgement (NACK) is being sent toward the source.

The maximum time ($T_{rack}$) that can pass between forwarding a reservation or deletion request at a core router, ($R_i$) to the next router ($R_{i+1}$) and receiving an acknowledgement for it, is the sum of $D_i$, $D_{i+1}$, $D_{rtt_{i,i+1}}$, and $T_{router}$, wherein $D_i$ is the buffering delay on the incoming interface of the link connecting $R_i$ and $R_{i+1}$; and $D_{i+1}$ is the buffering delay on the incoming interface of the link connecting $R_{i+1}$ and $R_i$; $D_{rtt_{i,i+1}}$ is the round trip propagation delay between $R_i$ and $R_{i+1}$; and $T_{router}$ is the time period between sending two RACK messages. The values of the buffering delay at a router $R_i$ can be assumed to be known to $R_i$ and are exchanged in the RACK messages. To determine the round trip propagation delay, the routers include in their RACK messages a timestamp ($T_{stamp}$) indicating when this packet was sent. For example, router $R_i$ sends a RACK message at t1 to router $R_{i+1}$. Router $R_{i+1}$ then includes in its RACK message to $R_i$ the timestamp (t1) as well as the time elapsed between receiving the RACK message from $R_i$ and sending its own ($T_{wait_i}$). Combining the arrival time of the RACK message from $R_{i+1}$ (t2), the sending timestamp (t1) and $T_{wait_i}$ router $R_i$ can determine the round trip propagation delay $D_{rtt_{i,i+1}}$ to $R_{i+1}$ as:

$$D_{rtt_{i,i+1}} = t2 - t1 - T_{wait_i}$$

As the calculation of $D_{rtt_{i,i+1}}$ includes possible buffering delays at both router $R_i$ and router $R_{i+1}$ the router should take the minimum value of $D_{rtt_{i,i+1}}$ as the actual propagation delay. In case an accurate estimation of the propagation delay between the edge elements and the source and destination nodes is not possible, a large default value should be used at the edge elements for setting their $T_{rack}$ instead of the actual propagation delay. Each router adds to the $T_{delay}$ field in the request messages its value of $T_{rack}$. Thereby, when arriving at the destination node, the propagation delay, $T_{delay}$, indicates the maximum time that can elapse between sending a reservation packet at the source and receiving a negative acknowledgement in return. The maximum end-to-end round trip delay of a request message consists of the following components: $D_{upstream}$, $D_{downstream}$, $T_{feedback}$, and $T_{rtt}$, wherein the upstream delay, $D_{upstream}$, is the buffering delay at the routers on the way from the source to the destination node; and the downstream delay, $D_{downstream}$, is the buffering delay at the routers on the way from the destination node to the source; and the feedback delay, $T_{feedback}$, is the time that can elapse between receiving a request at a destination node and sending a scheduled acknowledgement in return, and, $T_{rtt}$, is the end-to-end round trip propagation delay between the source and destination node. Wherein the $T_{feedback}$ can be set to a global variable for the protocol, or carried as an additional field in the ACK messages. $T_{delay}$ is a conservative estimation of the combination of the buffering delays ($D_{upstream}$ and $D_{downstream}$) as well as the propagation delay ($T_{rtt}$). In practice, $T_{delay}$ estimates the delay for packets that take the same route in both directions, which is not necessarily the case for acknowledgement packets. To ensure that the source timer, $T_s$, does not expire before an acknowledgement, positive or negative, is received the source sets $T_s$ to:

$$T_s = \max(T_{delay}, \max(T_{recv} - T_{send})) + T_{feedback}$$

with $T_{send}$ as the timestamp of some request message (M) and $T_{recv}$ as the time at which an acknowledgement for request M was received. The expression $\max(T_{recv} - T_{send})$ indicates hence, the maximum round trip delay measured between the source and the destination node. Further, the source sets the delay time, $T_{delay}$, in the reservation packet to the $T_{delay}$ determined during the query phase. The source-edge element sets it timer $T_{R_E}$ to:

$$T_{R_E} = T_{delay} - D_{R_E} - D_{rtt}$$

with $D_{R_E}$ as the maximum buffering delay for packets arriving on the link connecting the source to the edge element and $D_{rtt}$ as the either the round trip propagation delay between the source and the edge element or an estimation of it. Before forwarding the reservation packet to the next router the edge element set $T_{delay}$ in the request to $T_{R_E}$.

At the core routers, each router, i, sets its timeout, $T_{R_i}$, to:

$$T_{R_i} = T_{delay} - T_{rack_i}$$

and reduces the delay time $T_{delay}$ in the reservation packet by $T_{rack_i}$ as well.

Figure 8:
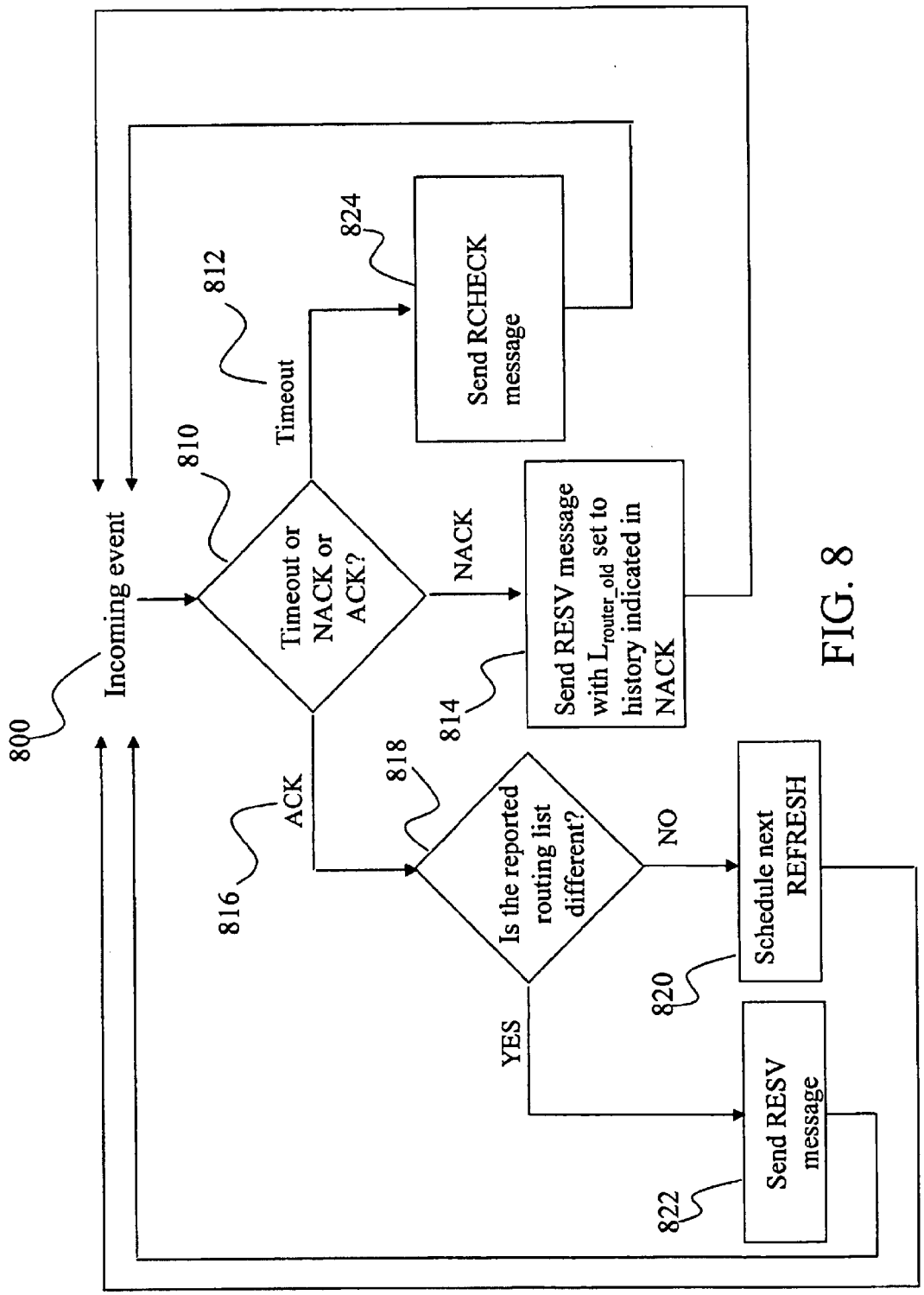
FIG. 8 is a flowchart depicting the behavior of a PQoS sender.

The behavior of a PQoS source is depicted in FIG. 8, wherein an incoming event step 800 is submitted to a decision element 810, which is configured to query the incoming event and ascertain if it includes a timeout 812, a negative acknowledgement message NACK 814, or an acknowledgement message, ACK, 816, and route the event accordingly. If the event includes an ACK 816 the event is sent to a decision element 818 where it is queried if the reported routing list is different from what is expected. If the routing list is not at variance with what is expected, then the schedule is submitted to the next routine REFRESH and the loop is repeated by going to the incoming event step 800. If the routing list is at variance with what is expected then go to element 822, which is configured to send a Reservation packet, RESV, and going to the incoming event step 800. If the event includes a NACK 814 then a Reservation packet, RESV, with $L_{router\_old}$ is set to the history indicated in the NACK and the loop is repeated by going to the incoming event step 800. If the incoming event step 800 includes a timeout 812 send a RCHECK message 824 and go to the incoming event step 800.

Implementation Issues

To alert core routers to more closely examine the contents of the request messages, the PQoS messages are carried in IP packets with an IP router alert option. To differentiate between data and control traffic it suffices for the case of unicast to use a different port number. For the case of multicast, destination nodes should not be allowed to receive the multicasted data flow before establishing a reservation for it. However, as the destination nodes need to wait for a REFRESH packet before sending an acknowledgement, the multicasted control data should be completely isolated from the data traffic it is controlling. This isolation could lead to problems in the situation where the network establishes different multicast trees for the control and data traffic. As both multicast sessions have the same sources and destination nodes, this situation is rarely expected to occur. In determining the maximum time a negative acknowledgement might arrive at a destination node, the PQoS may assume lossless inter-router communication. To realize such a situation, RACK messages need to be transmitted with the highest possible priority in the network. To accommodate possible losses, the core routers might retransmit the received flow identities for n times in their RACK messages. In this case, the calculations of time to RACK, $T_{rack}$, would require modification as well.

$$T_{rack} = D_i + D_{i+1} + T_{rtt_{i,j+1}} + n \times T_{router}$$

Where, $T_{rack}$, router acknowledgement, is the maximum time that can pass between the forwarding a reservation or deletion request; $D_i$ is the buffering delay on the incoming interface of the link connecting $R_i$ and $R_{i+1}$; $D_{i+1}$ is the buffering delay on the incoming interface of the link connecting $R_{i+1}$ and $R_i$; $D_{rtt_{i,j+1}}$ is the round trip propagation delay between $R_i$ and $R_{i+1}$; and $T_{router}$ is the time period between sending two RACK messages; where $T_{rtt,\ i=1}$ is the end-to-end round trip propagation delay between the source node and the destination node.

Pricing-Based Services

Figure 9:
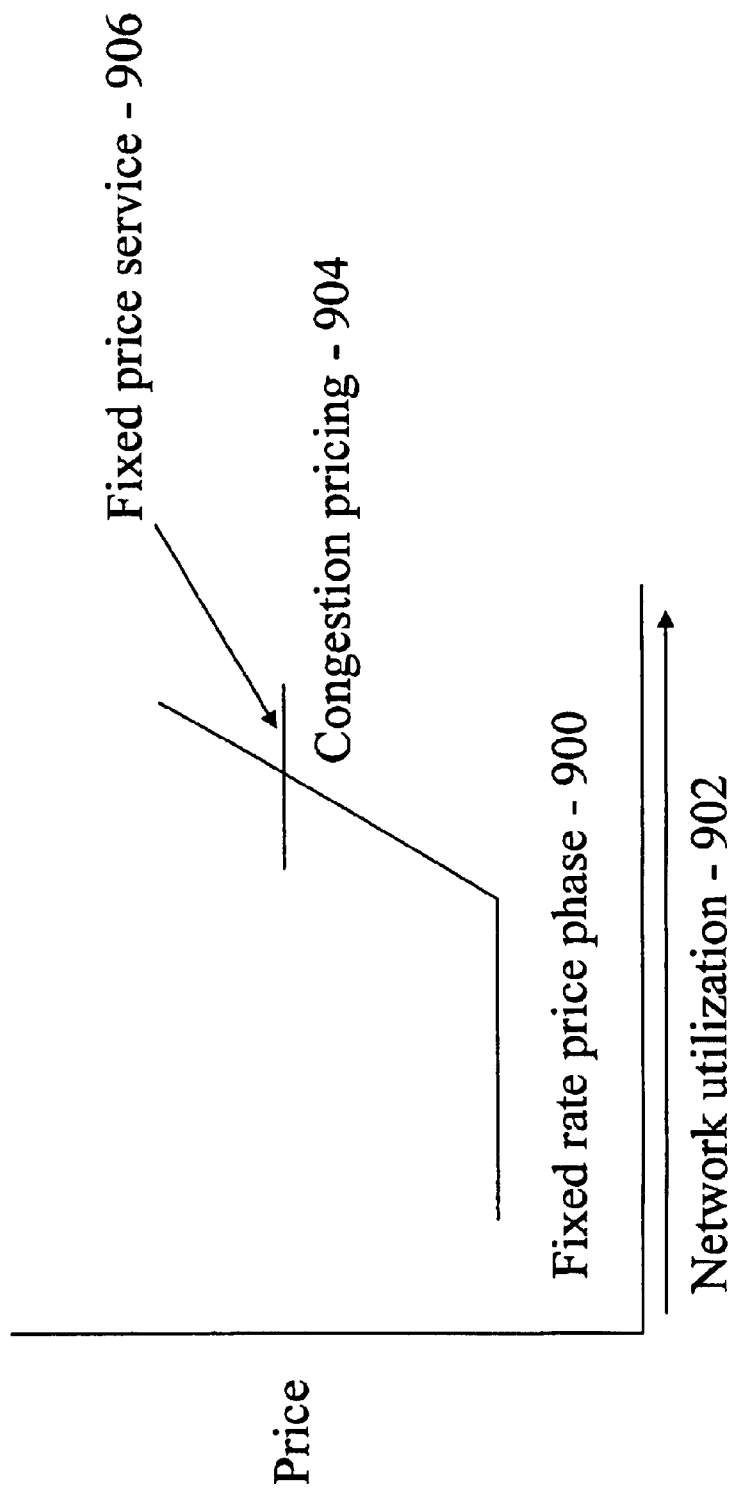
FIG. 9 is a pricing model, relating price to the level of network utilization.

Requesting a specific QoS level is primarily a request for an appropriate bandwidth allocation, wherein such an allocation will provide sufficient bandwidth to support the requested QoS level. As a seller of bandwidth, a network provider would want to sell as much bandwidth as possible, but not so much as to necessitate the rejection of new incoming requests. Hence, to avoid the case where all of the available bandwidth is allocated to few destination nodes, the network provider would increase the price of the bandwidth, to conform the available supply to existing demand. This conformity ensures that only higher priced or more important data will enter the network during periods of peak congestion. Note that does not necessarily refer to monetary values, however monetary values may be used as a factor in price setting. For example, in an intra-domain network, employee position might be used as a basis for pricing. Using this kind of congestion pricing has one of two implications. If the network provider keeps adjusting the price of the network's resources in accordance with the congestion situation, the prices will not be predictable, as they will depend on the amount of bandwidth the provider can offer and the number of users in the network, both of which are dynamic figures. This complicates planning for users who like to plan activities and communication expenses in advance. If the network provider decided to keep the price for an established flow constant, the price for a certain connection would still vary depending on the number of users in the network and the load situation. However, after establishing a connection, costs for the communication would be fixed and predictable. This, however, would lead to unfairness in the sense that two reservation packets that arrive at the same time but are handled sequentially would have different prices. This apparent dichotomy is resolved using a combination of predictable fixed prices and congestion pricing. Such solution suggests using a pricing function that has a shape similar to the function depicted in FIG. 9. This function allows the network provider to sell bandwidth, or other resources, at a fixed rate price 900 while in abundance. However, as network resources become scarce, the price of the bandwidth is increased 904. The abundance of network resources is closely correlated with the level of network utilization 902, higher levels of network utilization result in fewer resources being available for new traffic. The exact shape of the pricing function depends on the actual costs incurred by the provider, the expected utilization level, and number of users. To satisfy users requesting fixed and predictable prices 906, the network provider may consider the flexibility, and willingness of other network users to adapt to different kinds of pricing-based services. Cost may also be allocated based on the anticipated network loading, such as evenings or weekends. Further the stability of network load could be used to glean a better understanding of how the network will be loaded in the future. Network predictability, based on either internal or external factors may also be utilized in setting the price for network resources. This would be especially useful in heavily automated networks.

Fixed Price and Fixed Quality Service (FPFQ)

Fixed price and fixed quality service (FPFQ) is designed for users who require fixed and predictable prices and are not willing, or cannot adapt their QoS requirements in accordance with the network load situations. To ensure profitability, even when most of the available network resources are allocated, the network provider will necessarily price the service above the fixed rate. Thus the FPFQ user pays a premium for the fixed price and QoS even when there are ample resources. In this case, the FPFQ user indicates, in QUERY packets, the amount of required network resources. The traversed core routers will indicate the price of the requested resources, assuming they have enough resources to accommodate the new flow. If sufficient resources are not available, the resources field in the QUERY message is adjusted to reflect the amount of available resources at the router. The source must then decide either to accept the reduced level of service or quit the session. When the network can support the requested resources, or the source is willing to adjust its reservation in accordance with the query results, the source issues a reservation packet, RESV, indicating the desired QoS level. After accepting a reservation for this FPFQ service, the routers need not update the bandwidth requirements, $B_{req}$, and price, P, fields in the REFRESH packets, as these are fixed for the duration of the data flow.

Fixed Price and Variable Quality Service (FPVQ)

Knowing its financial capabilities, the user might opt for a service that provides the best possible service for a preset price. Hence, the FPVQ user receives a specific amount of resources after the session initiation. Depending on network congestion and changes in resource prices, the amount of resources dedicated to the user of the FPVQ service change. To avoid transmitted data losses the user needs to adjust transmission behavior, to comport with the changed network load conditions. Transmission behavior would include bandwidth use. During the query phase, the user specifies the price the user is willing to pay in the pricing field, P. The traversed routers adjust the bandwidth field, $B_{req}$, in accordance with their current load and price situation. Hence, the received ACK message at the source indicates the amount of resources the user can get for the specified price. If the available resources are adequate, the source initiates a RESV request. In the REFRESH packets, the routers adjust the bandwidth field $B_{req}$ in accordance with changes in the load and prices. The edge elements then need to adjust their policing or shaping parameters to reflect the dynamic changes of resource allocation in the network.

Variable Price and Fixed Quality Service (VPFQ)

In some situations the user cannot readily adapt resource consumption. This is the case, for example, with a telephony data flow. In such a situation a user, despite being relatively inflexible in resource consumption, would, never-the-less like to benefit from prices lower than those assessed for the fixed rate and fixed QoS service. These users are candidates for Variable Price and Fixed Quality Service. The VPFQ provides a kind of risk incentive. The user specifies in its QUERY message the amount of resources it needs. The intermediate routers adjust the pricing field, P, to indicate their prices for the requested resources. If the requested resources cannot be allocated, perhaps because of the limited financial resources of the source, or simply because there is not enough bandwidth, the resources field in the QUERY message is set to the amount of available resources at the router. The source must then decide to either accept the reduced QoS level or abandon the session. In the periodic REFRESH packets, the routers inform the source about the current prices. If the price exceeds the user's ability to pay, the network architecture will terminate the communication, or reduce the QoS. Additionally, the edge elements need to adjust their accounting information for the user to reflect the dynamic changes in prices in the network.

Hybrid Services

In the service examples above, the models considered had either fixed data flow reservations, the price fixed for the duration of the data flow, or had a changing reservation or price with a granularity of the REFRESH packets. Other models could be further extended to accommodate the case of bandwidth leasing. That is, the source would request a fixed price and QoS level for a period of time smaller than the lifetime of the connection. Such a service could be realized in a plurality of ways. One of the simpler ways is to reissue a reservation packet for each phase, or period in the data flow. For example, when the source requires a fixed price and QoS, it sends a reservation packet indicating the source's needs. For the period in which the data flow parameters are altered, the source can then delete its old resources and start a new reservation with the new parameters. Another possibility is to indicate in the reservation packet the length of period the source expects the network to provide fixed prices and QoS. After the end of this period, the source needs to renegotiate its price and QoS level with the network. Using such an approach, the edge element marks a flow as belonging to a specific QoS level for the negotiated time period. If, after this period, the source does not negotiate a new price and QoS level, the edge element either drops all packets arriving from that source or sends its data as best-effort packets, or otherwise at a lower level of service. The price for the service in the hybrid case would be higher than that of an adaptive service with the price increasing for the case of longer negotiated data flow periods.

Price Predictability and Routing

As each traversed core router contributes to the final price a user needs to pay for a specific service the final price might change depending on the number of traversed core routers. However, the number of core routers along the path of a flow can potentially vary during the lifetime of a flow. This path change may then lead to differences in the prices of similar connections used during a single data flow, even in the case of a FPFQ service. To obtain a fixed price for a pair of end systems (e.g. a source node and a destination node), without being required to fix the route between the two end systems, one might use relative prices. That is, instead of adding the actual price of a resource at a core router to the price field in the reservation packet, the core router might simply indicate how much more expensive the requested resource is compared to a fixed price. So, if the core router was in the fixed price zone in the pricing function, a zero is added to the price field. Otherwise, the price indicated by the pricing function is divided by the base price and this value is added. Hence, if a request passes a non-congested network the user would be billed a base price no matter which route the flow takes. In case of passing congested networks, only congested core routers contribute to the increase in the price. In a multicast communication scenario, the paths connecting the destination nodes to the sources might vary in their capacity. To accommodate this heterogeneity, the source might use different strategies. First the source may attempt a homogeneous reservation, wherein the source uses a single QoS level and expects the paths towards all destination nodes to support this QoS level. Here, only a fixed QoS level can be used (i.e., FPFQ or VPFQ services). A destination node can then join a session only if the REFRESH packets received by the destination node show that the route from the source has enough resources to support the needed QoS level. In a more flexible scenario, the source might opt to use the QoS level supported by the worst path. In this case, when a new destination node wants to join the session and the REFRESH packets towards the new destination node show that the path connecting the source to the new destination node is even worse than the current level, the source needs to adapt to the new reduced QoS level, and the source-edge element needs to change its shaping or policing parameters in accordance with the new QoS level. If the homogeneous reservation is not suitable, or not selected the source may opt for a layered transmission. The layered data transmission allows the source to divide its data into n different layers. Based on the resource availability on the path from the source to the destination node, the destination node can join up to n layers. The number of layers and resources allocated to the different layers can then be adjusted based on the heterogeneity of the destination nodes and the network. For the unicast case the amount of reserved resources and sent data can be charged to either the source node or destination node, or can be split between both of the nodes, using simple control information in the control packets. For the case of multicast session, charging the source for the communication is the same as for the unicast case. However, the issue is more difficult when the destination nodes are supposed to pay. Destination nodes are likely to pay in situations involving video conferencing or telephony. When joining a multicast group, a destination node would only be directly responsible for the data traversing the links connecting the destination node to the multicast tree. All destination nodes would share the links of the multicast tree. The routing table maintained at the source indicates which destination nodes share which core routers. This could give a good basis for distributing the costs among the destination nodes.

What is claimed is:

1. An apparatus for pricing-based quality of service delivery of data packets from user to user where the users each have financial limits, at least one service profile, application needs, and make user-to-user dynamic resource reservations; and transmit data in the form of data packets having headers for the inclusion of data delivery-related data markings, wherein data packets are delivered from user to user through the apparatus, the apparatus comprising:

a computer network having dynamically allocated network resources including data transmission bandwidth and processor capacity, the computer network including:

a plurality of node systems, with the plurality of node systems includes a source node system and a destination node system;

a network cloud comprising:

a plurality of edge elements connected with the plurality of node systems such that each node system is connected with at least one edge element; and a plurality of interconnected core routers, wherein the plurality of interconnected core routers is connected with the plurality of edge elements such that each of the edge elements is connected with at least one core router and such that each node system in the plurality of node systems is communicatively connected with each other node system in the plurality of node systems by a path through the network cloud; and wherein the network resources are monitored and are configured to provide a plurality of predictable and dynamically allocatable quality of service levels, with each quality of service level guaranteeing a particular combination of network resources and including a price of service, with the price of service of each quality of service level set to optimize the admission of transmission data through the network and to avoid congestion within the network;

whereby users of the network use node systems to transmit data to other users using other node systems in the network with the transmission taking place through the network cloud, enabling the users to dynamically select a quality of service level depending on their needs and ability to pay the price.

2. An apparatus for pricing-based quality of service delivery of data packets as set forth in claim 1, wherein if a user attempts to utilize resources beyond that user's financial resources, the transmission will be handled by at least one of the following protocols:

i. ignoring the transmission;

ii. sending at lower service level; and iii. sending as best effort traffic.

3. An apparatus for pricing-based quality of service delivery of data packets as set forth in claim 1, wherein all elements except the network cloud are configured to operate as wireless nodes.

4. An apparatus for pricing-based quality of service delivery of data packets as set forth in claim 1, wherein the Internet provides the core routers, and wherein the users are terminals that are interfaced with the Internet.

5. An apparatus for pricing-based quality of service delivery of data packets as set forth in claim 1, wherein the network is an intranet, and financial limits are allocated based on at least one of the following:

the identity of a person operating a user node; and the identification of the user node.

6. An apparatus for pricing-based quality of service delivery of data packets as set forth in claim 1, wherein the network is the Internet and price of service is denominated in currency.

7. An apparatus for pricing-based quality of service delivery of data packets as set forth in claim 1, wherein the quality of service level guarantees a particular combination of network resources such that the network supports at least one of the following:

i. telephony;

ii. video conferencing.

8. An apparatus for pricing-based quality of service delivery of data packets as set forth in claim 1, wherein the price of service of at least one quality for service level is adjusted based on at least one of the following:

i. anticipated network loading;

ii. stability of network load;

iii. predictability of network load.

9. An apparatus for pricing-based quality of service delivery of data packets as set forth in claim 1, wherein the purchase price is set at a level, which discourages network over-use to minimize congestion while maximizing overall profit from the network.

10. An apparatus for pricing-based quality of service delivery of data packets as set forth in claim 1, wherein resource costs are distributed among all user nodes.

11. An apparatus for pricing-based quality of service delivery of data packets as set forth in claim 1, wherein the quality of service levels are selected from the group consisting of:
   a. variable price and fixed quality of service;
   b. fixed price and fixed quality of service;
   c. fixed price and variable quality of service; and
   d. hybrid services.

12. An apparatus for pricing-based quality of service delivery of data packets as set forth in claim 11, wherein the quality of service level is user-determined.

13. A method for pricing-based quality of service delivery of data packets from user to user where the users each have financial limits, at least one service profile, application needs, and make user-to-user dynamic resource reservations; and transmit data in the form of data packets having headers for the inclusion of data delivery-related data markings, wherein data packets are delivered from user to user using the method, the method comprising the following steps:
   providing a computer network having dynamically allocated network resources including data transmission bandwidth and processor capacity, the provided computer network including:
      a plurality of node systems, with the plurality of node systems includes a source node system and a destination node system;
      a network cloud comprising:
         a plurality of edge elements connected with the plurality of node systems such that each node system is connected with at least one edge element; and
         a plurality of interconnected core routers, wherein the plurality of interconnected core routers is connected with the plurality of edge elements such that each of the edge elements is connected with at least one core router and such that each node system in the plurality of node systems is communicatively connected with each other node system in the plurality of node systems by a path through the network cloud; and
   wherein the network resources are monitored and are configured to provide a plurality of predictable and dynamically allocatable quality of service levels, with each quality of service level guaranteeing a particular combination of network resources and including a price of service, with the price of service of each quality of service level set to optimize the admission of transmission data through the network and to avoid congestion within the network;
   whereby users of the network use node systems to transmit data to other users using other node systems in the network with the transmission taking place through the network cloud, enabling the users to dynamically select a quality of service level depending on their needs and ability to pay the price.

14. A method for pricing-based quality of service delivery of data packets as set forth in claim 13, wherein if a user attempts to utilize resources beyond that user's financial resources, the transmission will be handled by at least one of the following protocols:
   i. ignoring the transmission;
   ii. sending at lower service level; and
   iii. sending as best effort traffic.

15. A method for pricing-based quality of service delivery of data packets as set forth in claim 13, wherein all elements except the network cloud are configured to operate as wireless nodes.

16. A method for pricing-based quality of service delivery of data packets as set forth in claim 13, wherein the Internet provides the core routers, and wherein the users are terminals that are interfaced with the Internet.

17. A method for pricing-based quality of service delivery of data packets as set forth in claim 13, wherein the network is an intranet, and financial limits are allocated based on at least one of the following:
   the identity of a person operating a user node; and
   the identification of the user node.

18. A method for pricing-based quality of service delivery of data packets as set forth in claim 13, wherein the network is the Internet and price of service is denominated in currency.

19. A method for pricing-based quality of service delivery of data packets as set forth in claim 13, wherein the quality of service level guarantees a particular combination of network resources such that the network supports at least one of the following:
   i. telephony;
   ii. video conferencing.

20. A method for pricing-based quality of service delivery of data packets as set forth in claim 13, wherein the price of service of at least one quality for service level is adjusted based on at least one of the following:
   i. anticipated network loading;
   ii. stability of network load;
   iii. predictability of network load.

21. A method for pricing-based quality of service delivery of data packets as set forth in claim 13, wherein the purchase price is set at a level, which discourages network over-use to minimize congestion while maximizing overall profit from the network.

22. A method for pricing-based quality of service delivery of data packets as set forth in claim 13, wherein resource costs are distributed among all user nodes.

23. A method for pricing-based quality of service delivery of data packets as set forth in claim 13, wherein the quality of service levels are selected from the group consisting of:
   a. variable price and fixed quality of service;
   b. fixed price and fixed quality of service;
   c. fixed price and variable quality of service; and
   d. hybrid services.

24. A method for pricing-based quality of service delivery of data packets as set forth in claim 23, wherein the quality of service level is user-determined.

* * * * *